(12) United States Patent
Sano et al.

(10) Patent No.: US 10,277,830 B2
(45) Date of Patent: Apr. 30, 2019

(54) SOLID-STATE IMAGING APPARATUS AND LIGHT-SHIELDING PIXEL ARRANGEMENTS THEREOF

(71) Applicant: Sony Corporation, Tokyo (JP)

(72) Inventors: Kenichi Sano, Tokyo (JP); Masayuki Tachi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/342,805

(22) Filed: Nov. 3, 2016

(65) Prior Publication Data

US 2017/0150063 A1 May 25, 2017

Related U.S. Application Data

(63) Continuation of application No. 14/278,913, filed on May 15, 2014, now Pat. No. 9,571,762.

(30) Foreign Application Priority Data

May 22, 2013 (JP) .................................. 2013-107677

(51) Int. Cl.
*H04N 5/232* (2006.01)
*H04N 5/228* (2006.01)
(Continued)

(52) U.S. Cl.
CPC ......... *H04N 5/243* (2013.01); *H04N 5/23212* (2013.01); *H04N 5/355* (2013.01);
(Continued)

(58) Field of Classification Search
CPC .. H04N 5/3696; H04N 5/23296; H04N 5/369; H04N 5/232; H01L 27/14623;
(Continued)

(56) References Cited

U.S. PATENT DOCUMENTS

2010/0091161 A1* 4/2010 Suzuki ............. H01L 27/14609
348/302
2010/0245631 A1* 9/2010 Hoda .................... G03B 13/36
348/241
(Continued)

FOREIGN PATENT DOCUMENTS

JP 2009-217252 9/2009
JP 2009-244854 10/2009
(Continued)

OTHER PUBLICATIONS

Official Action (no English translation available) for Japanese Patent Application No. 2013-107677 dated Sep. 1, 2016, 11 pages.

*Primary Examiner* — Daniel M Pasiewicz
*Assistant Examiner* — Selam T Gebriel
(74) *Attorney, Agent, or Firm* — Sheridan Ross P.C.

(57) ABSTRACT

There is provided a signal processor including a phase difference detection part configured to acquire a pixel value of one light-shielding pixel having a part of a light-receiving region shielded therein and pixel values of a peripheral pixel row of the light-shielding pixel in a light shielding direction. A corrected pixel value obtained by subjecting the pixel value of the light-shielding pixel to a reduced sensitivity correction is compared with the pixel values of the peripheral pixel row to detect a phase difference of the light-shielding pixel.

6 Claims, 21 Drawing Sheets

(51) Int. Cl.
*H04N 5/243* (2006.01)
*H04N 5/355* (2011.01)
*H04N 5/369* (2011.01)
*H04N 5/3745* (2011.01)
*H04N 5/378* (2011.01)

(52) U.S. Cl.
CPC ........... *H04N 5/3696* (2013.01); *H04N 5/378* (2013.01); *H04N 5/37455* (2013.01)

(58) Field of Classification Search
CPC ......... H01L 27/14605; H01L 27/14627; H01L 27/14645
See application file for complete search history.

(56) References Cited

U.S. PATENT DOCUMENTS

| | | | |
|---|---|---|---|
| 2011/0085785 A1* | 4/2011 | Ishii | G03B 13/00 396/104 |
| 2012/0140100 A1* | 6/2012 | Shibazaki | H01L 27/14621 348/281 |
| 2013/0120644 A1* | 5/2013 | Fujii | G02B 7/36 348/349 |
| 2013/0194471 A1* | 8/2013 | Yamashita | H04N 5/374 348/308 |

FOREIGN PATENT DOCUMENTS

| | | |
|---|---|---|
| JP | 2009-244862 | 10/2009 |
| JP | 2011-232544 | 11/2011 |
| JP | 2012-173334 | 9/2012 |
| JP | 2013-214048 | 10/2013 |

\* cited by examiner

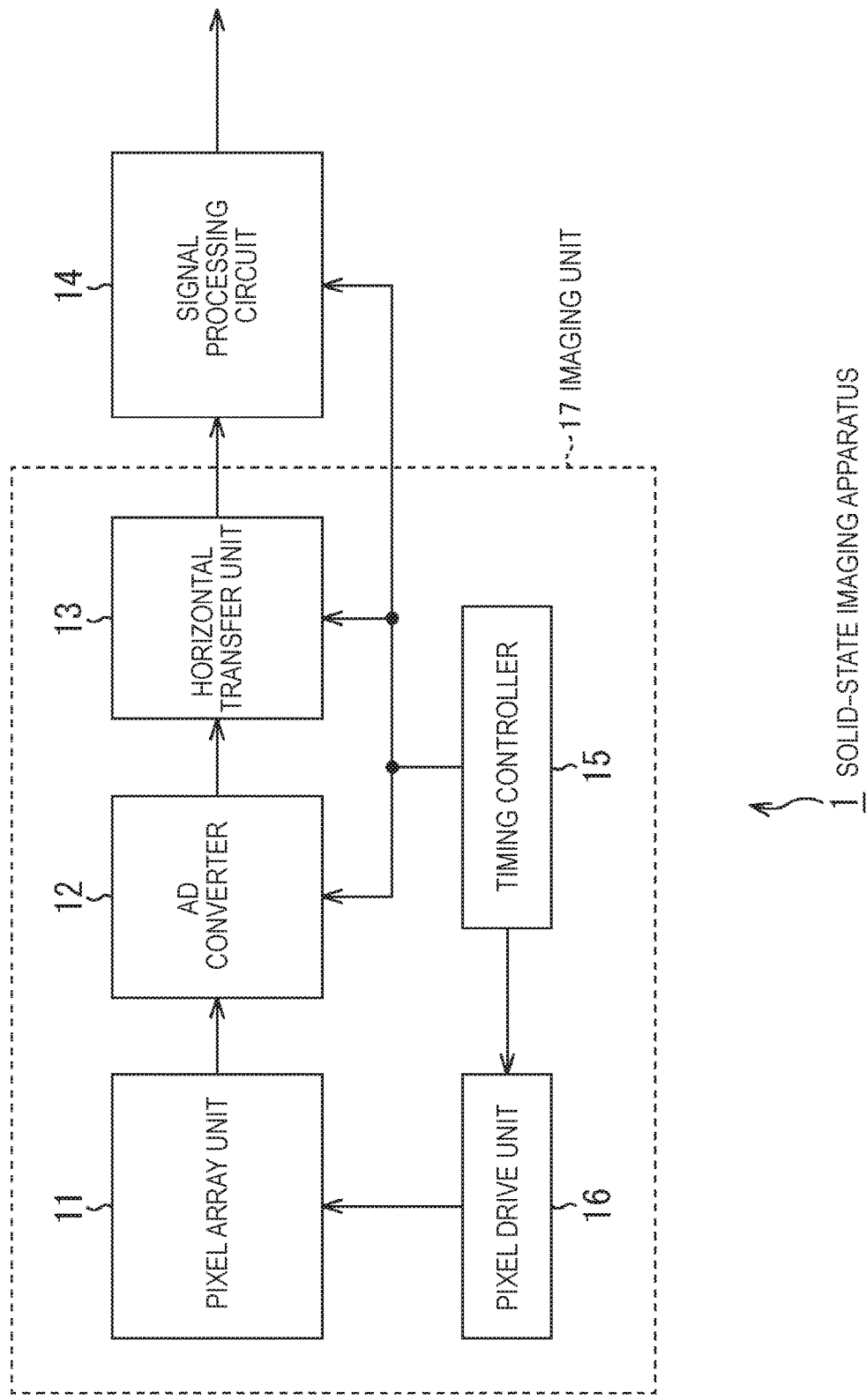

ONE SIDE LIGHT-SHIELDING PIXEL

NORMAL PIXEL

OPPOSITE SIDE LIGHT-SHIELDING PIXEL

NORMAL PIXEL    OPPOSITE SIDE LIGHT-SHIELDING PIXEL

ONE SIDE LIGHT-SHIELDING PIXEL

NORMAL PIXEL
ONE SIDE LIGHT-SHIELDING PIXEL
OPPOSITE SIDE LIGHT-SHIELDING PIXEL

TARGET PIXEL

TARGET PIXEL

TARGET PIXEL

OPPOSITE SIDE LIGHT-SHIELDING PIXEL
ONE SIDE LIGHT-SHIELDING PIXEL
NORMAL PIXEL

TARGET PIXEL

ONE SIDE
LIGHT-SHIELDING PIXEL

NORMAL PIXEL

ONE SIDE
LIGHT-SHIELDING PIXEL

NORMAL PIXEL

ONE SIDE
LIGHT-SHIELDING PIXEL

NORMAL PIXEL

ONE SIDE
LIGHT-SHIELDING PIXEL

NORMAL PIXEL

SOLID-STATE IMAGING APPARATUS AND LIGHT-SHIELDING PIXEL ARRANGEMENTS THEREOF

CROSS REFERENCE TO RELATED APPLICATIONS

This application is a continuation of U.S. patent application Ser. No. 14/278,913, filed May 15, 2014, which claims the benefit of Japanese Priority Patent Application JP 2013-107677 filed May 22, 2013, the entire disclosures of which are incorporated herein by reference.

BACKGROUND

The present technology relates to a signal processor and a signal processing method, a solid-state imaging apparatus, and an electronic device, and particularly, relates to a signal processor configured to improve a degree of freedom of arrangement for a light-shielding pixel for detecting a phase difference and a signal processing method, a solid-state imaging apparatus, and an electronic device.

In recent years, a solid-state imaging apparatus is proposed which has phase difference pixels for focus detection arranged in addition to normal pixels for video output in a pixel region in which a plurality of pixels are arranged in a matrix (e.g., refer to JP 2011-33975A and JP 2012-23562A).

The phase difference pixel of related art generally includes a pixel pair of one side light-shielding pixel and opposite side light-shielding pixel which are regularly arranged, the one side light-shielding pixel having a light-receiving region therein a part of which (e.g., right side) is light-shielded, and the opposite side light-shielding pixel having a light-shielding region on a position opposite (e.g., left side) to that of the one side light-shielding pixel.

SUMMARY

However, since provision of the light-shielding pixel may possibly cause the image quality of the imaging apparatus to deteriorate, the arrangement of light-shielding pixels has largely been constrained in order to achieve a balance between deterioration reduction and highly accurate phase difference detection.

It is desirable to improve a degree of freedom of arrangement of the light-shielding pixels for detecting the phase difference. The present technology is made in consideration of such a situation.

According to a first embodiment of the present technology, there is provided a signal processor including a phase difference detection part configured to acquire a pixel value of one light-shielding pixel having a part of a light-receiving region shielded therein, and pixel values of a peripheral pixel row of the light-shielding pixel in a light shielding direction, and compare a corrected pixel value obtained by subjecting the pixel value of the light-shielding pixel to a reduced sensitivity correction with the pixel values of the peripheral pixel row to detect a phase difference of the light-shielding pixel.

According to the first embodiment of the present technology, there is provided a signal processing method performed by a signal processor configured to process a signal from an imaging unit having a light-shielding pixel, the method including acquiring a pixel value of one light-shielding pixel having a part of a light-receiving region shielded therein and pixel values of a peripheral pixel row of the light-shielding pixel in a light shielding direction, and comparing a corrected pixel value obtained by subjecting the pixel value of the light-shielding pixel to a reduced sensitivity correction with the pixel values of the peripheral pixel row to detect a phase difference of the light-shielding pixel.

According to the first embodiment of the present technology, a pixel value of one light-shielding pixel having a part of a light-receiving region shielded therein and pixel values of a peripheral pixel row of the light-shielding pixel in a light shielding direction are to be acquired, and a corrected pixel value obtained by subjecting the pixel value of the light-shielding pixel to a reduced sensitivity correction is to be compared with the pixel values of the peripheral pixel row so that a phase difference of the light-shielding pixel is to be detected.

According to a second embodiment of the present technology, there is provided a solid-state imaging apparatus including a pixel array unit including a light-shielding pixel having a light-shielding region where a part of a light-receiving region is light-shielded and a normal pixel not having the light-shielding region, wherein positions of the light-shielding regions of a plurality of the light-shielding pixels arranged in the pixel array unit are identical with each other.

According to a third embodiment of the present technology, there is provided an electronic device including a solid-state imaging apparatus including a pixel array unit including a light-shielding pixel having a light-shielding region where a part of a light-receiving region is light-shielded and a normal pixel not having the light-shielding region. Positions of the light-shielding regions of a plurality of the light-shielding pixels arranged in the pixel array unit are identical with each other.

According to the second and the third embodiments of the present technology, there is provided a pixel array unit including a light-shielding pixel having a light-shielding region where a part of a light-receiving region is light-shielded, and a normal pixel not having the light-shielding region. Positions of the light-shielding regions of a plurality of the light-shielding pixels arranged in the pixel array unit are identical with each other.

The signal processor and the solid-state imaging apparatus may be independent devices, respectively or modules mounted in other devices.

According to an embodiment of the present technology, the degree of freedom of arrangement of the light-shielding pixels for detecting the phase difference can be improved.

According to other embodiments of the present technology, the devices can be provided in which the degree of freedom of arrangement of the light-shielding pixels for detecting the phase difference is improved.

BRIEF DESCRIPTION OF THE DRAWINGS

FIG. 1 is a block diagram illustrating a schematic configuration of a solid-state imaging apparatus to which the present technology is applied.

DETAILED DESCRIPTION OF THE EMBODIMENT(S)

Figure 2A:
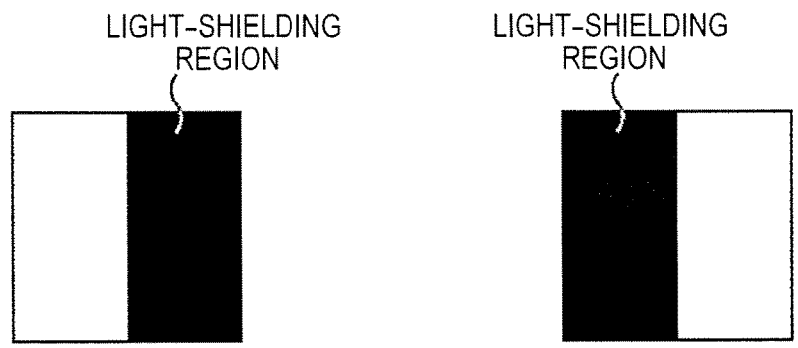
FIGS. 2A to 2C are diagrams explaining a light-shielding pixel.

<1. Exemplary Schematic Configuration of Solid-state Imaging Apparatus>

FIG. 1 is a block diagram illustrating a schematic configuration of a solid-state imaging apparatus to which the present technology is applied.

A solid-state imaging apparatus 1 in FIG. 1 includes pixel array unit 11, AD converter 12, horizontal transfer unit 13, signal processing circuit 14, timing controller 15, and pixel drive unit 16. The pixel array unit 11, AD converter 12, horizontal transfer unit 13, timing controller 15, and pixel drive unit 16 constitute an imaging unit 17.

The pixel array unit 11 is configured have a plurality of pixels arranged in a two-dimensional array (in a row direction and a column direction), each pixel having photodiodes in a photoelectric conversion part and plurality of pixel transistors (so-called MOS transistor). The plurality of pixel transistors may include, for example, a transfer transistor, a reset transistor, and an amplifier transistor. In accordance with other embodiments, the pixel may include four transistors, with a select transistor being added in addition to the above.

The pixel array unit 11 has, in addition to pixels for video output (hereafter, also referred to as normal pixels), light-shielding pixels used for focus detection that are located within the array unit 11 according to a predetermined arrangement. An exemplary arrangement of the light-shielding pixel will be described later.

The AD converter 12 has a plurality of ADCs (analog-digital converters) arranged for each pixel row of the pixel array unit 11. The AD converter 12 performs a CDS (correlated double sampling) processing on analog pixel signals output from the pixels of one row for each pixel row, and further, performs an AD conversion processing thereon. Digital pixel signals after the AD conversion processing are output to the horizontal transfer unit 13.

The horizontal transfer unit 13 includes a horizontal scanning circuit or the like, and sequentially outputs the digital pixel signals stored in respective ADCs in the AD converter 12 at a predetermined timing to the signal processing circuit 14.

The signal processing circuit 14 performs a predetermined digital signal processing on the pixel signals supplied from the horizontal transfer unit 13.

Specifically, the signal processing circuit 14 divides the pixels of the pixel array unit 11 into a plurality of regions on the basis of the pixel signal of the light-shielding pixel supplied from the horizontal transfer unit 13, and performs a phase difference detection processing for detecting a phase difference for each divided region. The signal processing circuit 14 performs a pixel interpolation processing for generating the pixel value for video output of the light-shielding pixel by use of the pixel values of the normal pixels near the light-shielding pixel, and the like, Note that the signal processing circuit 14 may be configured to perform the digital signal processing such as a black level adjustment processing, column variation correction processing and the like, for example, besides the phase difference detection processing and pixel interpolation processing described above.

The timing controller 15 includes a timing generator for generating various timing signals such as a vertical synchronization signal and horizontal synchronization signal, and the like. The timing controller 15 supplies the various timing signals generated by the timing generator to the AD converter 12, horizontal transfer unit 13, signal processing circuit 14, and pixel drive unit 16 to control operation timings of respective units.

The pixel drive unit 16 includes a shift register, for example, and selectively scans the pixels of the pixel array unit 11 in a unit of pixel row sequentially in a vertical direction to drive the AD converter 12 to output the pixel signal on the basis of a signal electric charge generated by the photoelectric conversion part in each pixel depending on an amount of received light.

The solid-state imaging apparatus 1 configured as above is configured, for example, as a CMOS image sensor of column AD system in which the ADC performing the CDS processing and the AD conversion processing is arranged for each pixel row.

<Examples of Light-shielding Pixel>

Next, with reference to FIG. 2, a description will be given of the light-shielding pixel as a pixel for focus detection In the past, in a case where the pixels for focus detection are arranged in the pixel array unit, a pixel pair of one side light-shielding pixel and opposite side light-shielding pixel is arranged in the pixel array unit, the one side light-shielding pixel having a light-receiving region therein a part of which is light-shielded, and the opposite side light-shielding pixel having a light-shielding region on a position opposite to that of the one side light-shielding pixel.

Figure 2B:
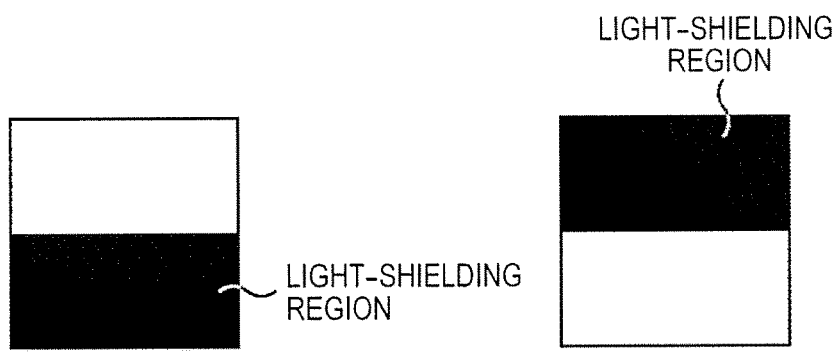
Figure 2C:
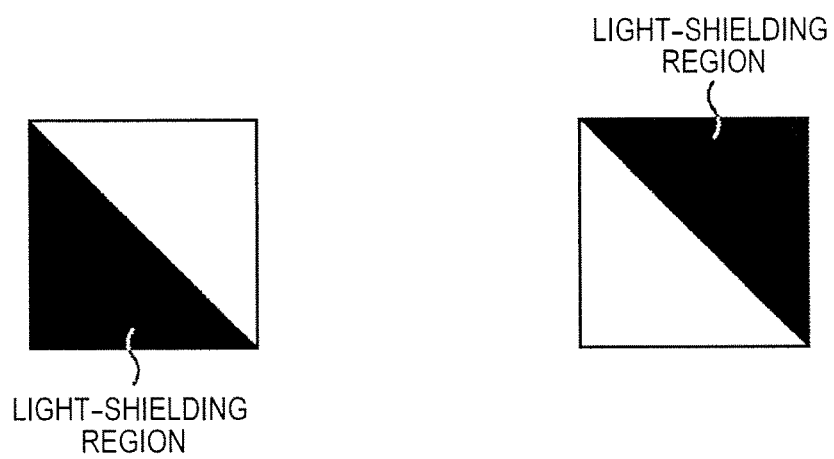

FIG. 2A to FIG. 2C show examples of the one side light-shielding pixel and opposite side light-shielding pixel.

FIG. 2A shows an example of the one side light-shielding pixel having a light-shielding region on the right side thereof and the opposite side light-shielding pixel having a light-shielding region on the left side thereof. A light shielding direction of the light-shielding pixel like this is referred to as a right and left direction (horizontal direction).

FIG. 2B shows an example of the one side light-shielding pixel having the light-shielding region on the lower side thereof and the opposite side light-shielding pixel having the light-shielding region on the upper side thereof. A light shielding direction of the light-shielding pixel like this is referred to as an up and down direction (vertical direction).

FIG. 2C shows an example of the one side light-shielding pixel having the light-shielding region on the lower left side thereof and the opposite side light-shielding pixel having the light-shielding region on the upper right side thereof. A light shielding direction of the light-shielding pixel like this is referred to as an oblique direction (right oblique direction).

Note that light-shielding pixels may be arranged so that the light-shielding region may be on one side light-shielding pixel or the opposite side light-shielding pixel in an expedient manner. Therefore, both of the pixels in a pair may be called the one side light-shielding pixel or the opposite side light-shielding pixel.

<Phase Difference Detection Method of Related Art>

A description will be given of a phase difference detection method of related art using the light-shielding pixel with reference to FIG. 3.

Figure 3:
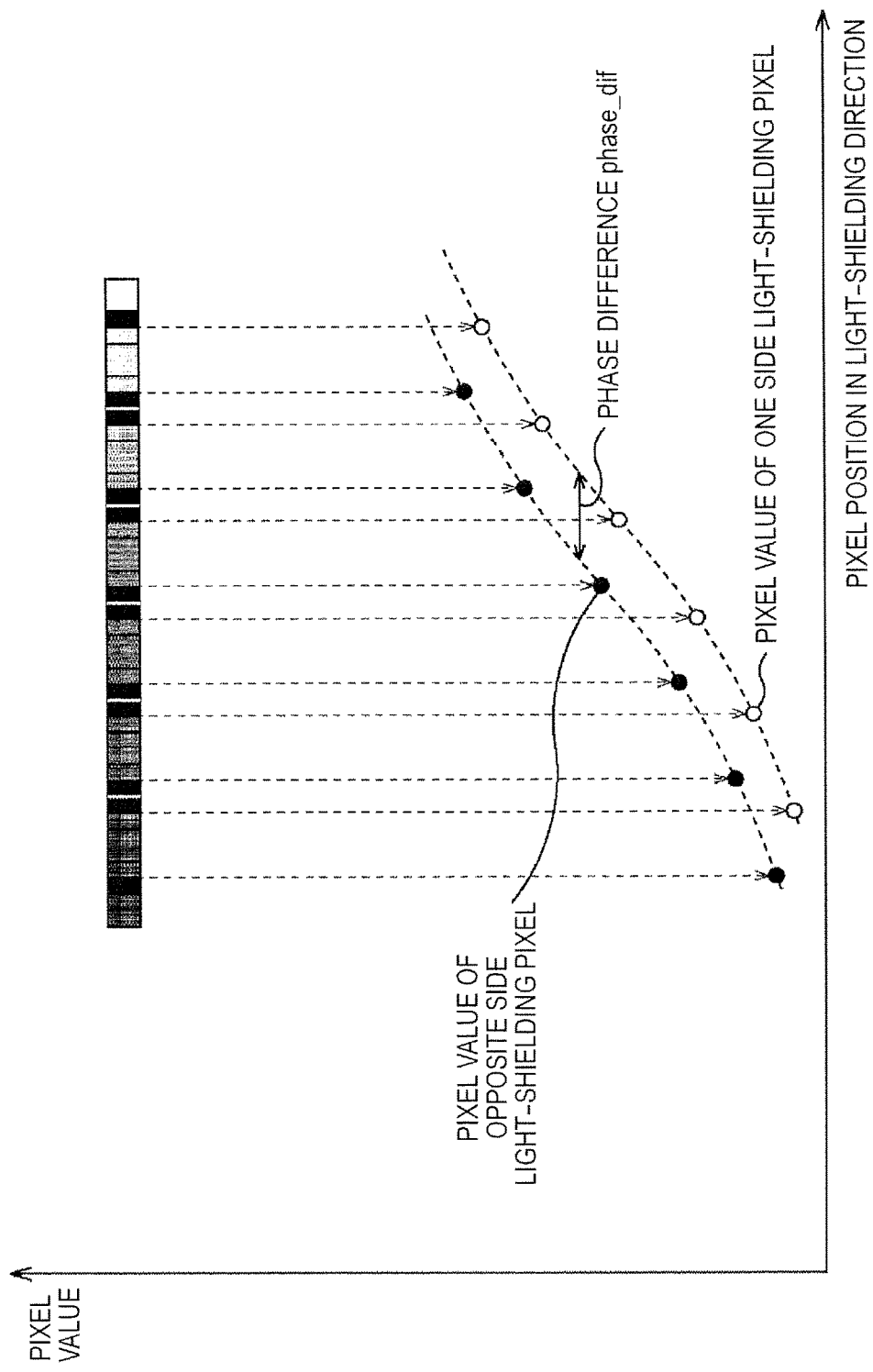
FIG. 3 is a diagram explaining a phase difference detection method of related art.

FIG. 3 shows a relationship between a pixel position and pixel value of each pixel in a case where a pair of one side light-shielding pixels, with one light-shielding pixel having a light-shielding region on the right side thereof and the other light-shielding pixel having a light-shielding region on the left side thereof, as shown in FIG. 2A, is regularly arranged in the light shielding direction. In FIG. 3, a plot of the pixel values of the normal pixels is omitted.

As shown in FIG. 3, the phase difference (image deviation) occurs between the pixel signals of the one side light-shielding pixel and the opposite side light-shielding pixel due to difference in a light-shielding position. A defocus amount can be calculated by finding a phase difference phase_dif of the pixel signal of the pair of one side light-shielding pixel and opposite side light-shielding pixel using a correlation operation, and thus, auto-focus can be achieved by adjusting (moving) an imaging forming lens.

Accordingly, in a case of detecting the phase difference by way of the method of related art, it has been desirable to configure the pixel array unit to have the pixel pair of one side light-shielding pixel and one opposite side light-shielding pixel arranged adjacent to one another, and further to have the light-shielding pixels in the pair.

<Exemplary Arrangement of Light-shielding Pixel of this Embodiment>

Figure 4:
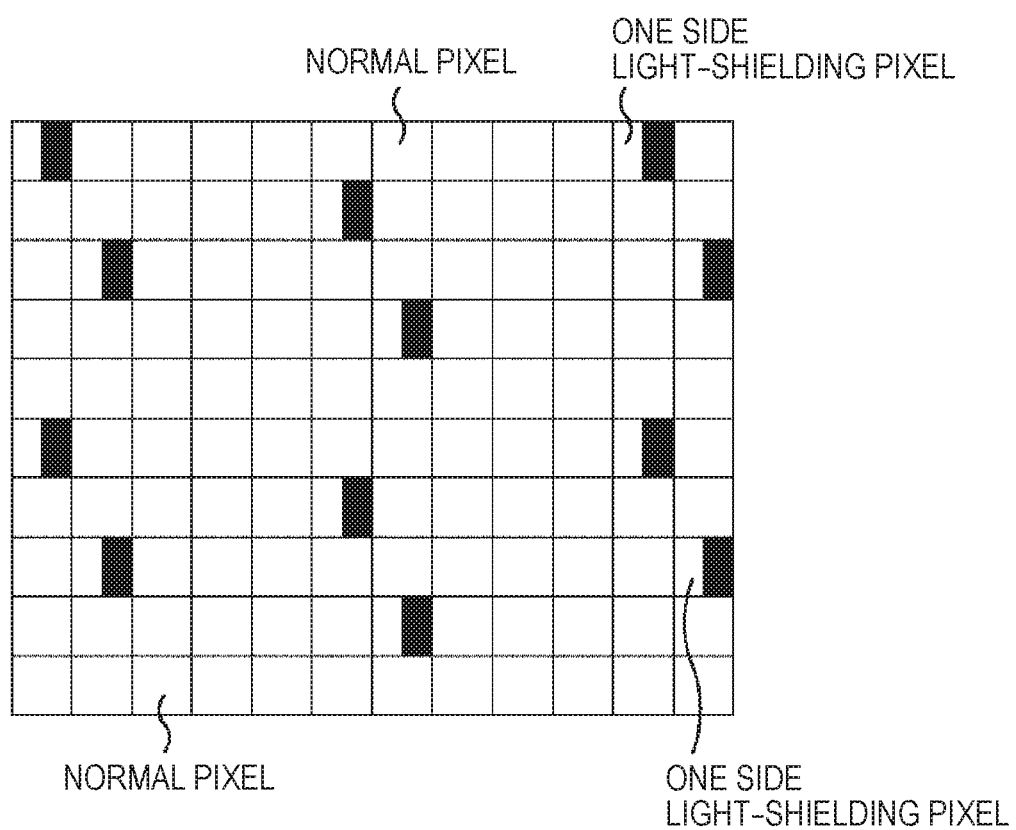
FIG. 4 is a diagram illustrating an exemplary arrangement of light-shielding pixels in accordance with embodiments of the present disclosure.

FIG. 4 shows an arrangement of the light-shielding pixels of the pixel array unit 11 in the solid-state imaging apparatus 1.

In the pixel array unit 11, the light-shielding pixels all have the same side of the pixel shielded from incident light. In particular, only one side light-shielding pixels having a light-shielding region on the right side thereof are included in the example of FIG. 4, arranged according to a predetermined rule. More specifically, the one side light-shielding pixels are sparsely arranged in the light shielding direction, and near the one side light-shielding pixel another one side light-shielding pixel is arranged in a direction different from the light shielding direction.

As described later, a phase difference detection method carried out by the signal processing circuit 14 (hereinafter, also referred to as the present method) can detect the phase difference by way of only a single one side light-shielding pixel. Therefore, it is not necessary to arrange the light-shielding pixels in pairs of one side light-shielding pixels and opposite side light-shielding pixels in the pixel array unit 11 as in the related art, and the light-shielding regions of all the light-shielding pixels can be the same as shown in FIG. 4.

Note that the light-shielding pixel arrangement to which the present method is applicable is not limited to the arrangement shown in FIG. 4, and other exemplary arrangements may be adopted of course, which will be described later in detail.

<2. Detailed Exemplary Configuration of Signal Processing Circuit>

Next, a description will be given in detail for the phase difference detection method carried out by the signal processing circuit 14.

<Block Diagram of Signal Processing Circuit>

Figure 5:
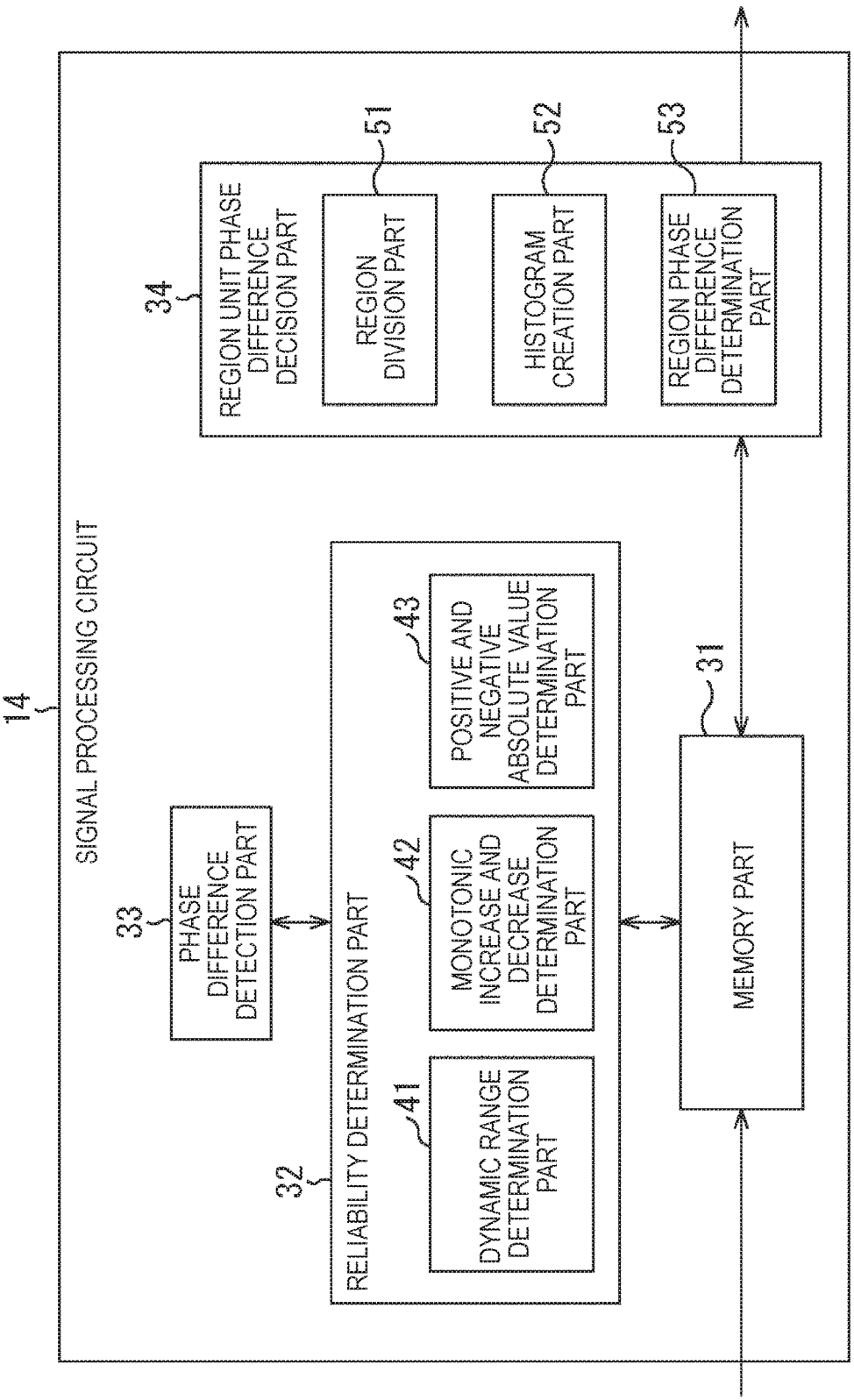
FIG. 5 is a block diagram of a signal processing circuit.

FIG. 5 is a functional block diagram illustrating an exemplary configuration of a phase difference detection processing portion of signal processing circuit 14.

The signal processing circuit 14 includes a memory part 31, reliability determination part 32, phase difference detection part 33, and region unit phase difference decision part 34.

The memory part 31 stores the pixel signals (pixel values) of the pixels supplied from the horizontal transfer unit 13 (FIG. 1). The memory part 31 may have a storage capacity for total number of all pixels the pixel array unit 11 or a storage capacity for a plurality of rows of the pixel array unit 11 necessary for the phase difference detection processing.

The memory part 31 also stores the phase difference of the light-shielding pixel determined and detected by the reliability determination part 32 and the phase difference detection part 33, respectively.

The pixel values and phase differences of the pixels stored in the memory part 31 are read out by the reliability determination part 32 and the region unit phase difference decision part 34 as necessary.

The reliability determination part 32 and the phase difference detection part 33 sequentially set the pixels of the pixel array unit 11 corresponding to the pixel values stored in the memory part 31 to a target pixel. Then, if the light-shielding pixel is set to the target pixel, the reliability determination part 32 determines reliability for phase difference detection. In other words, the reliability determination part 32 determines whether or not the light-shielding pixel set to the target pixel is a pixel appropriate for use in phase difference detection.

The reliability determination part 32 includes a dynamic range determination part 41, monotonic increase and decrease determination part 42, and positive and negative absolute value determination part 43.

The dynamic range determination part 41 sets to a peripheral pixel row a plurality of normal pixels at the periphery of the target pixel (i.e., of the light-shielding pixel) along the light shielding direction of the light-shielding pixel set to the target pixel, and acquires the pixel values of the pixels constituting the peripheral pixel row from the memory part 31.

Then, the dynamic range determination part 41 finds the maximum value and the minimum value of the pixel values of the peripheral pixel row to compute a dynamic range DR calculated from a difference between the maximum value and the minimum value, and determines whether or not the computed dynamic range DR is larger than a threshold DR_TH set in advance.

The monotonic increase and decrease determination part 42 computes a difference value (derivative value) PIX_DIF between the pixel values of pixels adjacent to each other in the peripheral pixel row, and determines whether or not the pixel values of the peripheral pixel row have a tendency of monotonic increase or monotonic decrease on the basis of the computed result. Specifically, the monotonic increase and decrease determination part 42 determines with respect to the peripheral pixel row whether all the computed pixel difference values PIX_DIF are larger than a monotonic increase threshold UP_TH (PIX_DIF>UP_TH), or smaller than a monotonic decrease threshold LO_TH (PIX_DIF<LO_TH).

As described above, the dynamic range determination part 41 and the monotonic increase and decrease determination part 42 determine whether or not the target pixel shows a clear phase difference and is a light-shielding pixel which has a low probability of error detection of the phase difference owing to a noise or texture.

Figure 6:
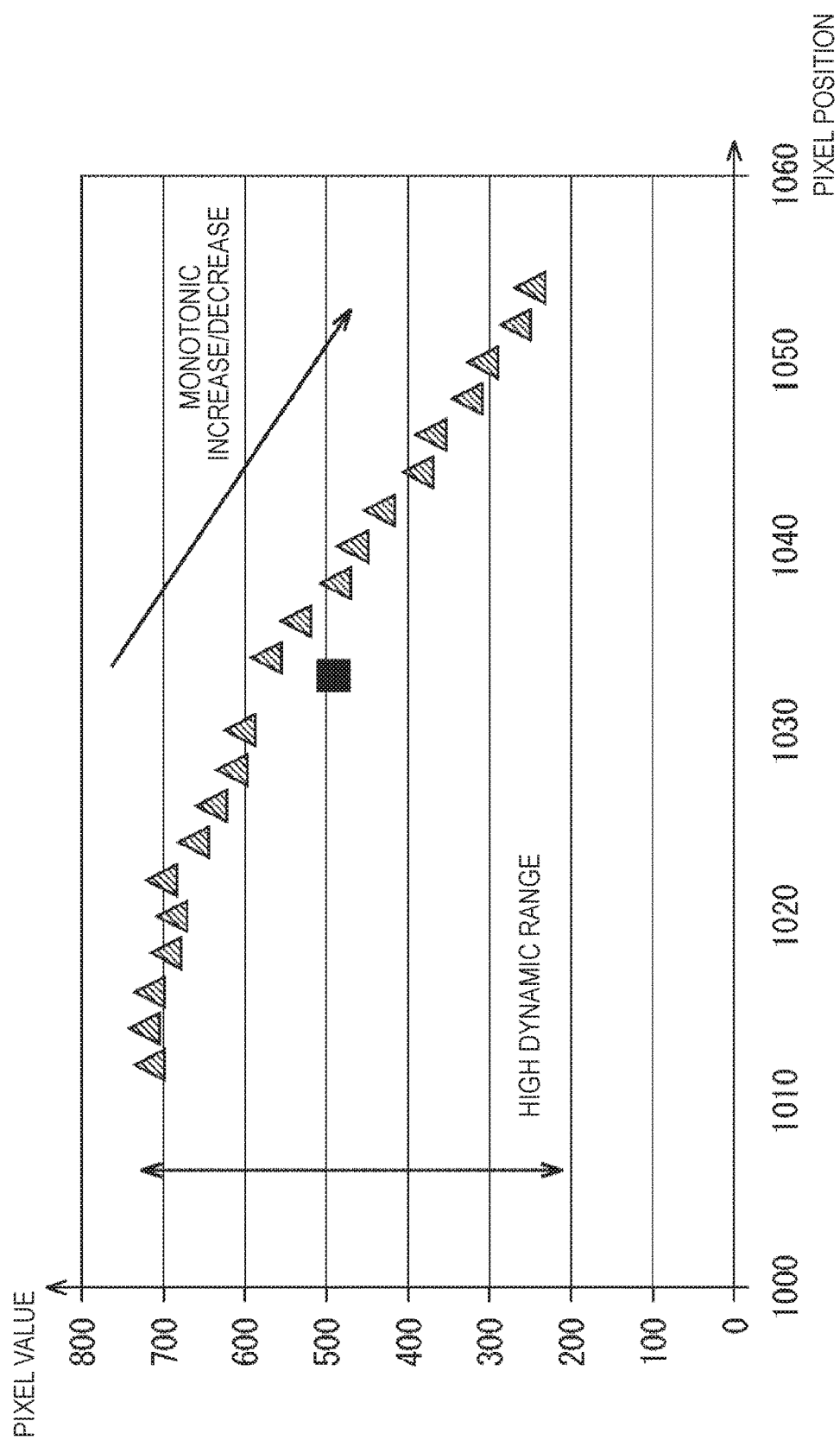
FIG. 6 is a diagram illustrating an exemplary pixel value of a peripheral pixel row.
Figure 7:
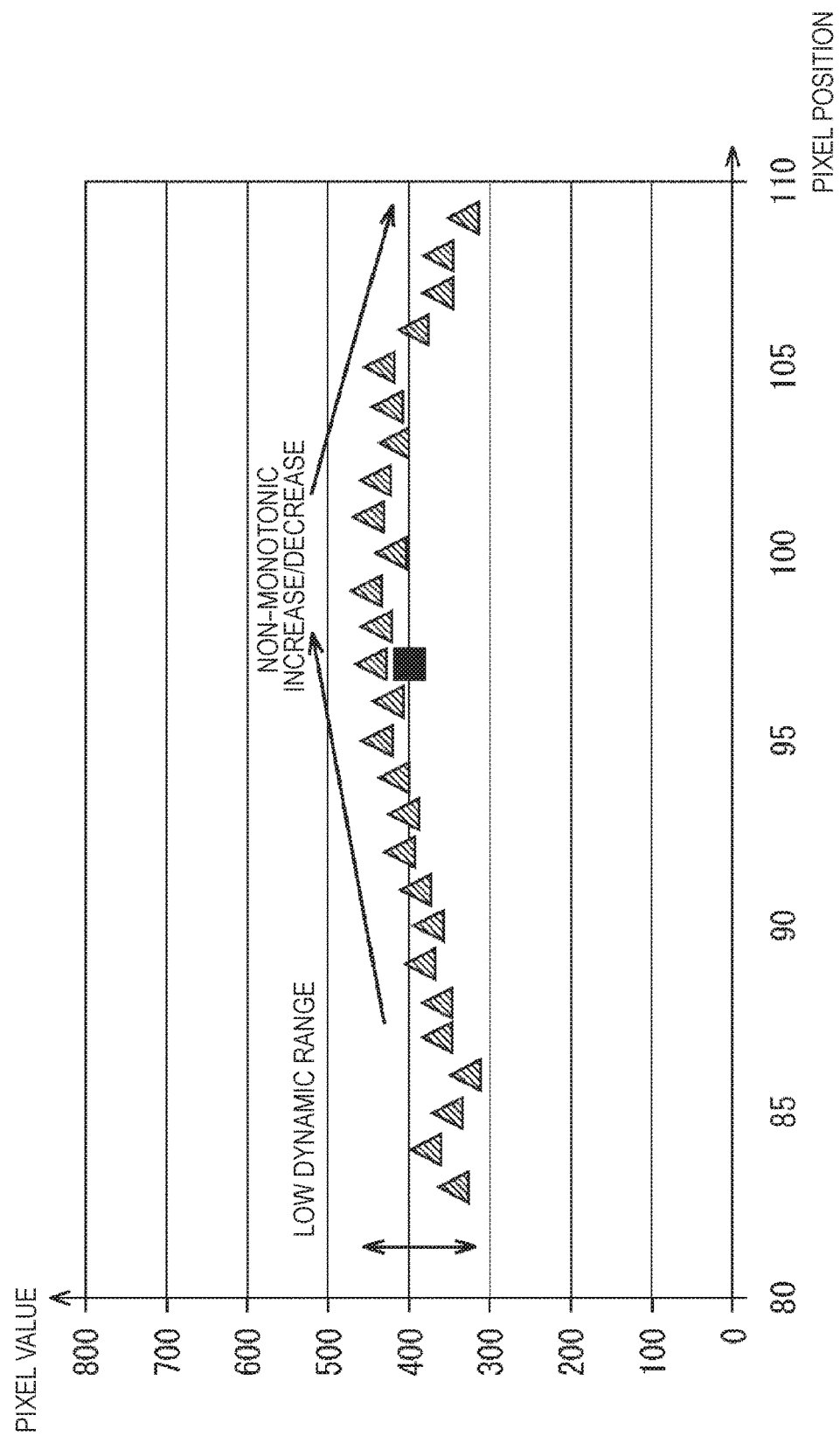
FIG. 7 is a diagram illustrating an exemplary pixel value of a peripheral pixel row.

FIG. 6 shows an example of the case where the computed dynamic range DR is larger than the threshold DR_TH and the pixel values of the peripheral pixel row have the tendency of monotonic increase or monotonic decrease. In FIG. 6 and FIG. 7, a hatched triangle indicates each pixel in the peripheral pixel row and a black rectangle indicates the target pixel (light-shielding pixel).

As shown in FIG. 6, in the case where the computed dynamic range DR is larger than the threshold DR_TH and the pixel values of the peripheral pixel row have the tendency of monotonic increase or monotonic decrease, the target pixel is determined to be a pixel appropriate to the phase difference detection.

Meanwhile, FIG. 7 shows an example of the case where the computed dynamic range DR is equal to or smaller than the threshold DR_TH and the pixel values of the peripheral pixel row do not have any tendency of monotonic increase and monotonic decrease.

As shown in FIG. 7, in the case where the computed dynamic range DR is equal to or smaller than the threshold DR_TH and the pixel values of the peripheral pixel row do not have any tendency of monotonic increase and monotonic decrease, the target pixel is determined to not be a pixel appropriate to the phase difference detection.

In the case where the dynamic range determination part 41 and the monotonic increase and decrease determination part 42 determine that the target pixel is a pixel appropriate to the phase difference detection, a phase difference detection instruction is supplied from the reliability determination part 32 to the phase difference detection part 33.

The phase difference detection part 33, when instructed to detect a phase difference of the target pixel from the monotonic increase and decrease determination part 42, detects (computes) the phase difference of the target pixel.

First, the phase difference detection part 33 carries out a gain multiple correction for multiplying the pixel value of the target pixel by a gain amount that depends on a shielding rate of the light-shielding pixel set to the target pixel to correct a reduced sensitivity of the target pixel depending on the shielding rate of the light-shielding pixel.

For example, shielding rate=(pixel value of light-shielding pixel)/(pixel values of near normal pixels) is calculated by use of the pixel values of the light-shielding pixel and near normal pixels in imaging a solid color subject to calculate in advance the shielding rate of each light-shielding pixel in the pixel array unit 11 to be stored in the phase difference detection part 33 as a correction table. The phase difference detection part 33 refers to the correction table to decide the shielding rate of the target pixel and to calculate the pixel value of the light-shielding pixel after the gain multiple correction=(pixel value of light-shielding pixel)/(shielding rate), and then, computes the pixel value of the target pixel after the gain multiple correction.

Alternatively, the gain multiple correction may be carried out depending on the shielding rate of the light-shielding pixel without the correction table, as below. That is, the phase difference detection part 33 finds a light-shielding pixel in a flat portion (region with less luminance variation) at the periphery of the target pixel from among images stored in the memory part 31, and calculates the shielding rate similarly to when forming the correction table for a selected light-shielding pixel. Then, the phase difference detection part 33 uses the shielding rate of the calculated peripheral flat portion as the shielding rate of the target pixel to calculate the pixel value of the light-shielding pixel after the gain multiple correction=(pixel value of light-shielding pixel)/(shielding rate) to compute the pixel value of the target pixel after the gain multiple correction.

Note that the phase difference detection part 33 may switch modes or the like to selectively carry out the gain multiple correction calculation by use of the shielding rate in the correction table or by use of the shielding rate of the light-shielding pixel in the peripheral flat portion without using the correction table.

Next, the phase difference detection part 33 computes the phase difference of the target pixel using a gain multiple correction value as the pixel value of the target pixel after the gain multiple correction and the pixel values of a plurality of peripheral normal pixels in the light shielding direction, the pixel values having a small difference from the gain multiple correction value.

Figure 8:
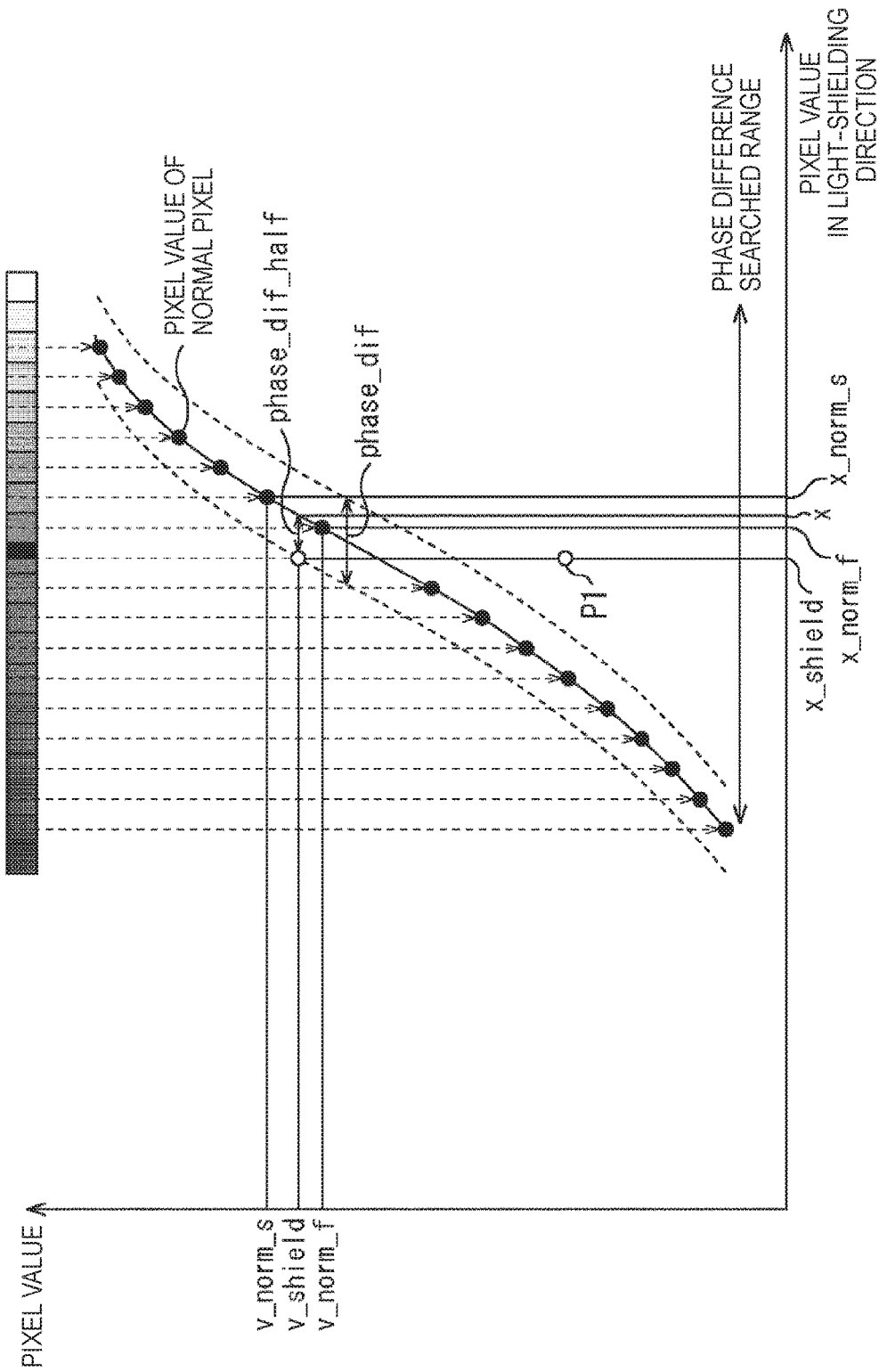
FIG. 8 is a diagram explaining a phase difference detection processing.

With reference to FIG. 8, a description will be given of the phase difference detection processing by the phase difference detection part 33.

FIG. 8 is a diagram plotting pixel positions and pixel values of the target pixel, which in this example is a one side light-shielding pixel having a light-shielding region on the right side thereof and a plurality of peripheral normal pixels disposed in the light shielding direction with respect to the target pixel.

In the example of FIG. 8, a pixel position of the target pixel in the light shielding direction (horizontal direction) is x_shield and the pixel value of the target pixel output from the imaging unit 17 is P1. A value obtained by subjecting the pixel value of the target pixel P1 to the gain multiple correction is a gain multiple correction value v_shield.

The phase difference detection part 33 finds the gain multiple correction value v_shield of the target pixel and the values of each of a plurality of peripheral normal pixels in the light shielding direction having a small difference from the value v_shield.

For example, if two periphery normal pixels in the light shielding direction having a small difference from the gain multiple correction value v_shield are to be identified, those pixels are a pixel at a pixel position x_norm_f with a pixel value v_norm_f having the smallest difference from the gain multiple correction value v_shield, and a pixel at a pixel position x_norm_s with a pixel value v_norm_s having the second smallest difference.

Then, the phase difference detection part 33 uses the pixel values of a plurality of found normal pixels to estimate a pixel position x of the target pixel on a pixel value waveform of the normal pixel. If two pixels are found, the ratio of a distance from a pixel position x of the target pixel to a pixel position x_norm_f to a distance from the pixel position x to a pixel position x_norm_s is set equal to a ratio W of a pixel difference between the gain multiple correction value v_shield and a pixel value v_norm_f to a pixel difference between the gain multiple correction value v_shield and a pixel value v_norm_s, to obtain the pixel position x of the target pixel on the normal pixel value waveform. This can be expressed as follows:

$$(v\_shield - v\_norm\_f):(v\_norm\_s - v\_shield) = (x - x\_norm\_f):(x\_norm\_s - x).$$

When the position x of the target pixel on the normal pixel value waveform is obtained, a distance (x−x_shield) between the position x on the normal pixel value waveform and the pixel position x_shield of the target pixel can be found. This distance (x−x_shield), as shown in FIG. 8, corresponds to phase_dif_half which is half the phase difference phase_dif currently wished to be found.

Assuming that the target pixel is a light-shielding pixel having a light-shielding region on the left side thereof, a value obtained by subjecting the pixel value of the light-shielding pixel to gain correction is positioned on a broken line shifted toward the right side by a distance of the phase_dif_half from the pixel signal of the normal pixel in FIG. 8. Therefore, a value obtained by doubling the distance (x−x_shield) between the position x on the normal pixel value waveform and the pixel position x_shield of the target pixel is the phase difference phase_dif which is the value currently desired, and a relationship of phase_dif=(x−x_shield)×2 holds such that the phase difference phase_dif of the target pixel can be found by calculating phase_dif=(x−x_shield)×2. Note that although the pixel signal of the light-shielding pixel is multiplied by the gain, the phase does not change, and thus, phase_dif in FIG. 3 is equal to phase_dif in FIG. 8.

As described above, the phase difference detection part 33 can use the gain multiple correction value v_shield of the target pixel, and the pixel positions x_norm_f and x_norm_s and pixel values v_norm_f and v_norm_s of two pixels in the light shielding direction having a small difference from the value v_shield to compute the phase difference phase_dif of the target pixel.

In the above described example, as a simple calculation example, the position x on the normal pixel value waveform corresponding to the gain multiple correction value v_shield is computed using the pixel values of two normal pixels having a small difference from the gain multiple correction value v_shield by way of the distance ratio between two points.

Other than such a method, the position x on the normal pixel value waveform may be found by using the pixel values of three or more normal pixels having a small difference from the gain multiple correction value v_shield to compute the normal pixel value waveform as an approximate straight line according to a least-square method and using the computed approximate straight line, for example.

Further, the position x on the normal pixel value waveform may be found by using the pixel values of three or more normal pixels having a small difference from the gain multiple correction value v_shield to compute the normal pixel value waveform by way of an approximate curve (function fitting) and using the computed approximate curve, for example.

The position x on the normal pixel value waveform can thus be found by using the approximate straight line and the approximate curve.

The phase difference detection part 33 compares the pixel value obtained by subjecting the pixel value of the light-shielding pixel as the target pixel to the gain multiple correction with the pixel values of the peripheral pixel row to detect the phase difference of the target pixel. Then, the phase difference detection part 33 supplies the detected the phase difference of the target pixel to the positive and negative absolute value determination part 43 in the reliability determination part 32.

Returning to the description for FIG. 5, the positive and negative absolute value determination part 43 operates only when the phase difference of the target pixel is detected in the phase difference detection part 33.

The positive and negative absolute value determination part 43 compares the phase difference of the target pixel detected by the phase difference detection part 33 with a phase difference of another light-shielding pixel near the target pixel (hereinafter, referred to as near light-shielding pixel) to determine whether or not the detected phase difference of the target pixel has a reliable value.

If the detected phase difference of the target pixel has a reliable value, absolute values of the phase difference of the phase difference of the target pixel and phase difference of near light-shielding pixel are near values. In other words, a difference in the absolute values of the phase difference of the target pixel and the phase difference of the near light-shielding pixel is a value smaller than a predetermined threshold NEAR_TH. In the embodiment, both the target pixel and the near light-shielding pixel are one side light-shielding pixels and the position of the light-shielding region in the pixels are the same, and thus, the phase difference of the target pixel and the phase difference of the near light-shielding pixel coincide in a positive or negative sign. In other words, a result obtained by multiplying the phase difference of the target pixel by the phase difference of the near light-shielding pixel has a positive value (>0).

Therefore, the positive and negative absolute value determination part 43 determines whether or not the result obtained by multiplying the phase difference of the target pixel by the phase difference of the near light-shielding pixel has a positive value (>0), and whether or not the difference in the absolute values of the phase difference of the target pixel and the phase difference of the near light-shielding pixel is a value smaller than a predetermined threshold NEAR_TH to determine whether or not the detected phase difference of the target pixel has a reliable value.

Here, if the target pixel and the near light-shielding pixel have the positions of the light-shielding region opposite to each other in the pixel as in the case where the target pixel is the one side light-shielding pixel and the near light-shielding pixel is the opposite side light-shielding pixel, the absolute values of the target pixel and phase difference of the near light-shielding pixel are near values but the phase differences do not coincide in a positive or negative sign. Therefore, in this case, the positive and negative absolute value determination part 43 determines whether or not the result obtained by multiplying the phase difference of the target pixel by the phase difference of the near light-shielding pixel has a negative value (<0), and whether or not the difference absolute value between the phase difference of the target pixel and the phase difference of the near light-shielding pixel is a value smaller than a predetermined threshold NEAR_TH to determine whether or not the detected phase difference of the target pixel has a reliable value.

The pixel array unit 11, as described referring to FIG. 4, has an arrangement which is sparse in the light shielding direction and has another one side light-shielding pixel arranged in a direction different from the light shielding direction. Therefore, a positive and negative absolute value determination processing by the positive and negative absolute value determination part 43 selects another one side light-shielding pixel arranged in a direction different from the light shielding direction as the near light-shielding pixel.

Note that the dynamic range determination part 41 and the monotonic increase and decrease determination part 42 determine whether or not the target pixel is a pixel appropriate to the phase difference detection before the phase difference detection part 33 carries out the phase difference detection processing. Therefore, the positive and negative absolute value determination processing by the positive and negative absolute value determination part 43 after the phase difference detection may be omitted.

If determined that the detected phase difference of the target pixel has a reliable value, the positive and negative absolute value determination part 43 stores the detected phase difference of the target pixel in the memory part 31.

The region unit phase difference decision part 34 divides the pixel region of the pixel array unit 11 into a plurality of regions and decides a phase difference for each region on the basis of the phase difference of each light-shielding pixel stored in the memory part 31.

The region unit phase difference decision part 34 includes a region division part 51, histogram creation part 52, and region phase difference determination part 53.

The region division part 51 divides the pixel region of the pixel array unit 11 into a plurality of regions.

For example, the region division part 51 divides the pixel region of the pixel array unit 11 into rectangle regions of division number n×m (n, m>1) as the simplest method. In many cases, such a division method has no problem, but in a case of the small division number, one region may possibly have a plurality of depths.

Therefore, the region division part 51 uses texture information on the taken image to extract a region probably having the same depth such that the regions recognized to have the same depth may be dealt with as one region.

The extraction of the same depth regions, which is substantially synonymous with recognizing and distinguishing the subject in the image, is difficult to accurately perform, but may be used as auxiliary information. A description will be given of an example in which under an assumption that the regions having the same depth are similar in colors to each other and a boundary with a region having a different depth becomes an edge, the region division part 51 uses color information or edge information of the image as the texture information on the image to extract the regions having the same depth.

First, the region division part 51 detects with respect to the taken image a portion having a large derivative value of the pixel value to extract an edge. Then, the region division part 51 determines whether or not colors in a region surrounded by the extracted edge are similar to each other, that is, whether or not ratios of RGB values are near each other. The regions determined to be similar in color are determined to be regions having the same depth.

Moreover, regions individually recognized using a facial recognition technology or the like may be also dealt with as regions having the same depth.

Figure 9A:
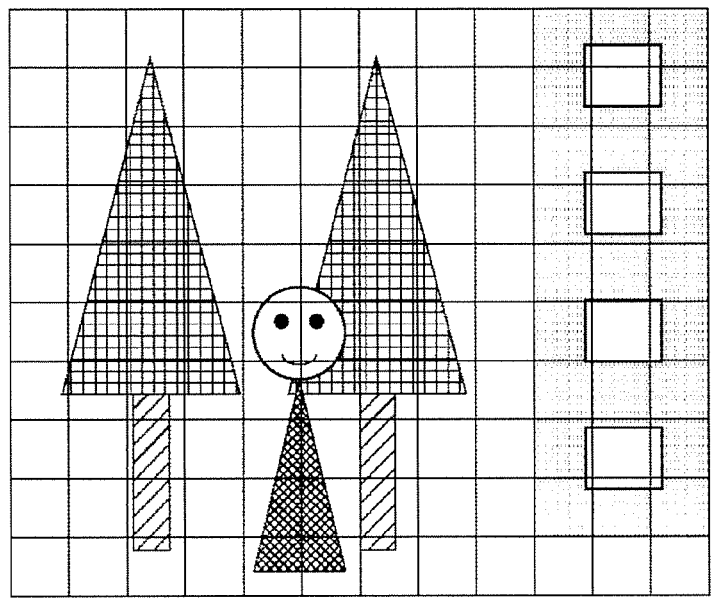
FIGS. 9A and 9B are diagrams explaining a process by a region division part.

FIG. 9A shows an example in which the taken image is divided into the rectangle regions of the division number n×m.

Figure 9B:
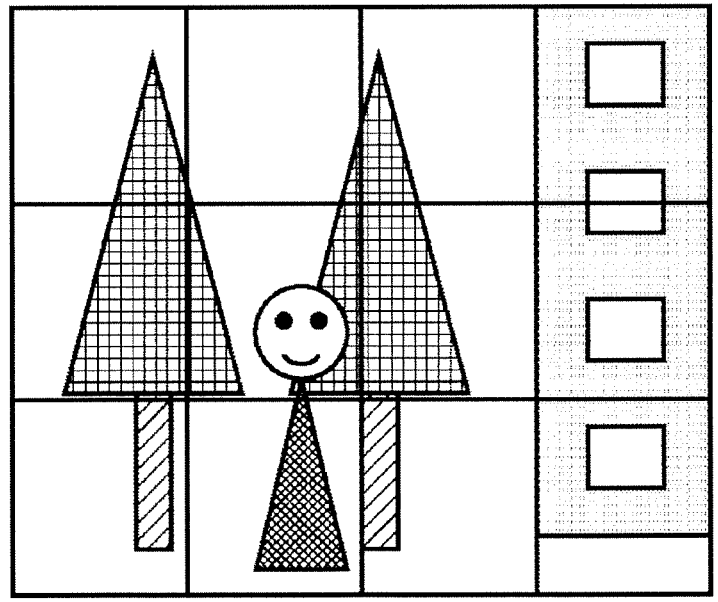

FIG. 9B shows an example in which after dividing into the rectangle regions of a predetermined division number, the regions having the same depth are further divided.

Note that if the division number n×m is equal to or more than a predetermined number, the region division by the same depth region extraction may be omitted. Moreover, only the region division by the same depth region extraction may be carried out without the division into the n×m rectangle regions.

However, the region division by the rectangle region and the region division by the same depth region extraction are combined such that the division number of the rectangle regions can be smaller to efficiently and effectively divide the region.

In the phase difference detection method of related art, the phase difference pixels need to be arranged in a pair that includes a one side light-shielding pixel and an opposite side light-shielding pixel, restricting a size or shape of the divisible region. However, the phase difference detection method by the signal processing circuit 14 in accordance with embodiments of the present disclosure can detect the phase difference by way of only a single one side light-shielding pixel, not restricting a size or shape of the divisible region. Therefore, as shown in FIG. 9B, the texture information of the image is used such that the phase difference for each region can be detected with respect to even regions divided to have various sizes and shapes.

Returning to the description in FIG. 5, the histogram creation part 52 acquires the phase difference of the light-shielding pixel stored in the memory part 31 to create a histogram of the phase difference for each region divided by the region division part 51.

The region phase difference determination part 53 uses the histogram of the phase difference for each region created by the histogram creation part 52 to determine the phase difference for each region. For example, the region phase difference determination part 53 adopts only a phase difference within a 95% confidence interval (mean value±2× standard deviation) and other phase differences are excluded as an outlier. Then, the region phase difference determination part 53 uses the phase difference in the region after the exclusion to compute the mean value and determine the computed result to be the phase difference for the region.

Figure 10:
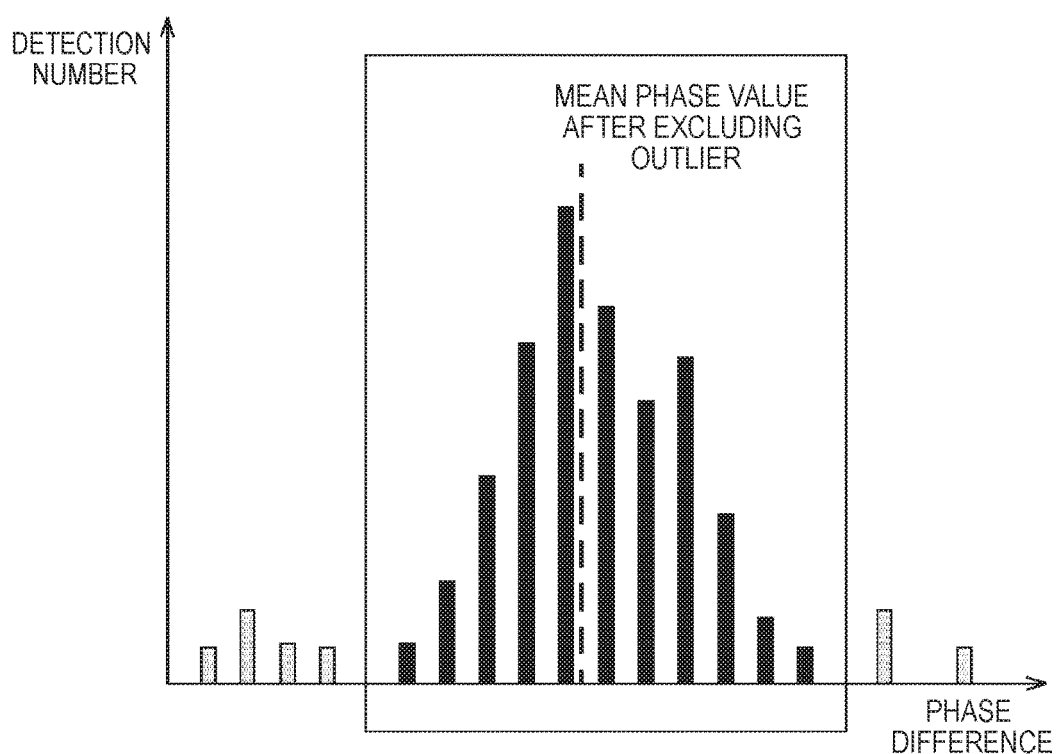
FIG. 10 is a diagram explaining a process by a histogram creation part.

FIG. 10 show an example in which only a phase difference surrounded by a rectangle in the histogram of the phase difference created by the histogram creation part 52 is adopted as a calculated target of the mean value to calculate the mean value of the phase difference in the region.

The region phase difference determination part 53 outputs the region information for recognizing a region and the phase difference of the region to a processing block in a latter stage.

The latter stage processing block is provided with, for example, a controller configured to compute the defocus amount on the basis of the detected phase difference, and to drive and control an imaging optical system. The controller selects from the phase differences for each region supplied from the region phase difference determination part 53 the phase difference of a region corresponding to a facial detection region which is recognized by way of a facial recognition processing and computes the defocus amount to drive and control the imaging optical system, for example. Alternatively, the controller selects from the phase differences for each region supplied from the region phase difference determination part 53 the phase difference of a region which is instructed to be operated by the user and computes the defocus amount to drive and control the imaging optical system.

<3. Process Flow of Phase Difference Detection Processing>

Figure 11:
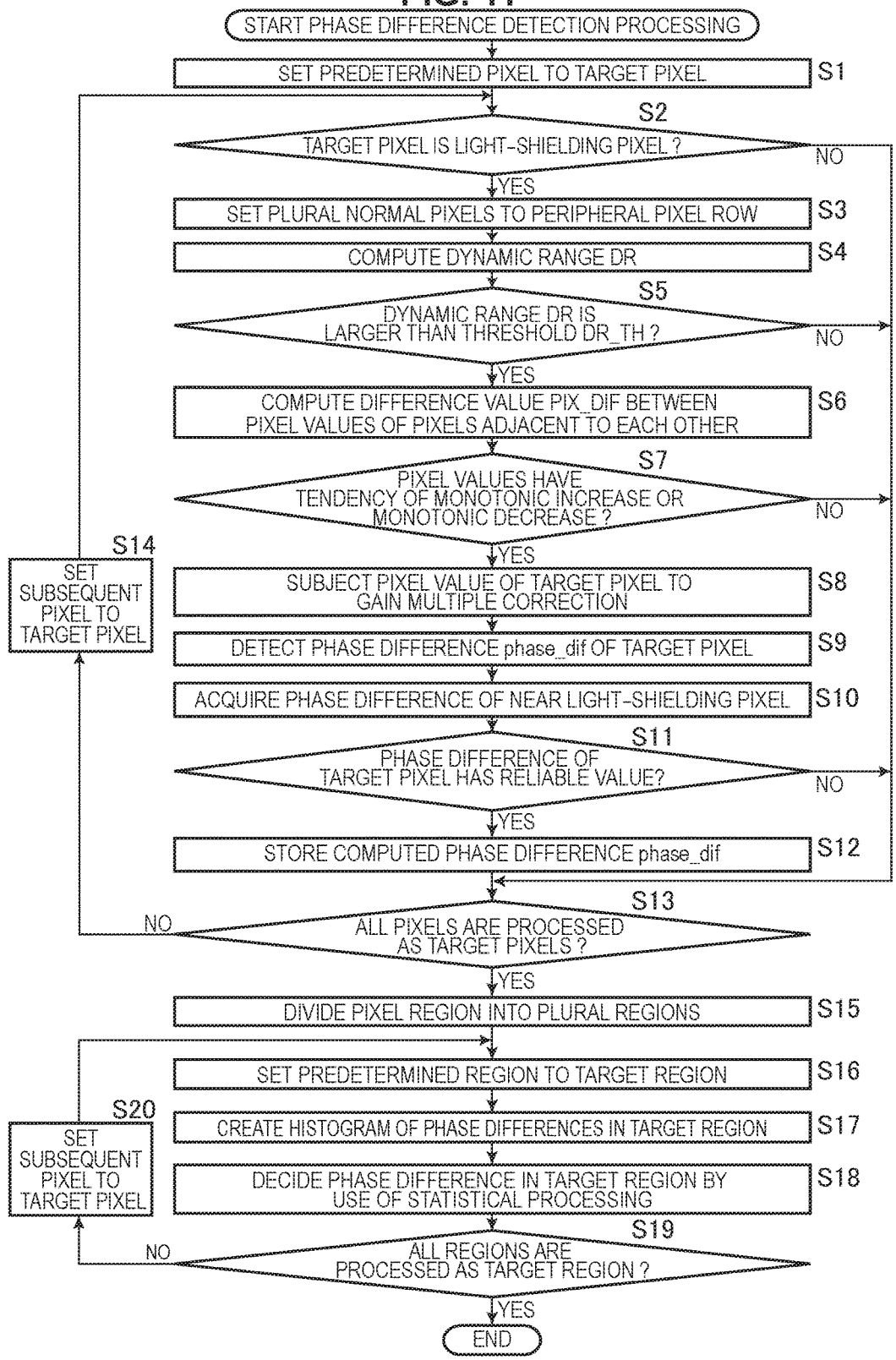
FIG. 11 a flowchart explaining phase difference detection processing according to embodiments of the present disclosure.

Next, with reference to a flowchart in FIG. 11, a description will be given of the phase difference detection processing by the signal processing circuit 14. This processing is started when a certain or more amount of pixel values of the images taken by the imaging unit 17 is accumulated in the memory part 31, for example.

First, at step S1, the reliability determination part 32 set a predetermined pixel corresponding to the pixel value stored in the memory part 31 to the target pixel. For example, the reliability determination part 32 sets, of the pixel values of one frame stored in the memory part 31, a pixel corresponding to a head pixel value in a case of reading in a raster scan order to the target pixel.

At step S2, the reliability determination part 32 determines whether or not the set target pixel is the phase difference pixel. Here, the signal processing circuit 14 has registered therein in advance which pixel in the pixel region of the pixel array unit 11 is the light-shielding pixel.

If determined at step S2 that the target pixel is not a phase difference pixel, the process proceeds to step S13.

Meanwhile, at step S2, if determined that the target pixel is a phase difference pixel, the process proceeds to step S3. At step S3, the dynamic range determination part 41 in the reliability determination part 32 sets to the peripheral pixel row a plurality of normal pixels at the periphery of the target pixel along the light shielding direction of the light-shielding pixel set to the target pixel. Then, the dynamic range determination part 41 acquires the pixel values of the pixels constituting the peripheral pixel row from the memory part 31.

At step S4, the dynamic range determination part 41 finds the maximum value and the minimum value of the pixel values of the peripheral pixel row to compute the dynamic range DR calculated from a difference between the maximum value and the minimum value.

At step S5, the dynamic range determination part 41 determines whether or not the computed dynamic range DR is larger than the threshold DR_TH.

If determined at step S5 that the computed dynamic range DR is not larger than the threshold DR_TH, the process proceed to step S13.

Meanwhile, if determined at step S5 that the computed dynamic range DR is larger than the threshold DR_TH, the process proceeds to step S6, and the monotonic increase and decrease determination part 42 computes the difference value PIX_DIF between the pixel values of pixels adjacent to each other in the peripheral pixel row. A plurality of difference values PIX_DIF are obtained.

At step S7, the monotonic increase and decrease determination part 42 determines with respect the peripheral pixel row whether or not the pixel values of the peripheral pixel row have the tendency of monotonic increase or monotonic decrease on the basis of a plurality of computed difference values PIX_DIF.

If determined at step S7 that the pixel values of the peripheral pixel row do not have the tendency of monotonic increase or monotonic decrease, the process proceeds to step S13.

Meanwhile, if determined at step S7 that the pixel values of the peripheral pixel row have the tendency of monotonic increase or monotonic decrease, the target pixel is determined to be a pixel appropriate to the phase difference detection, the process proceeds to step S8, and the phase difference detection instruction is supplied from the monotonic increase and decrease determination part 42 to the phase difference detection part 33.

At step S8, the phase difference detection part 33 supplied with the phase difference detection instruction subjects the pixel value of the target pixel to the gain multiple correction on the basis of the shielding rate of the light-shielding pixel set to the target pixel. The shielding rate of the light-shielding pixel set to the target pixel can be acquired from the correction table or found from the pixel values of the light-shielding pixel in the flat portion at the periphery of the target pixel and the pixel at the periphery of the light-shielding pixel as described above.

At step S9, the phase difference detection part 33 detects the phase difference phase_dif of the target pixel from the gain multiple correction value v_shield as the pixel value of the target pixel which is subjected to the gain multiple correction, and the pixel values of a plurality of peripheral normal pixels in the light shielding direction having small differences from the value v_shield.

Specifically, as described referring to FIG. 8, the position x of the target pixel on the normal pixel value waveform is found from a plurality of normal pixels at the periphery of the target pixel. Then, the pixel position x_shield of the target pixel and the position x on the normal pixel value waveform are used to compute the phase difference phase_dif of the target pixel by way or phase_dif=(x−x_shield)× 2. The phase difference phase_dif of the target pixel computed by the phase difference detection part 33 is supplied to the positive and negative absolute value determination part 43 in the reliability determination part 32.

At step S10, the positive and negative absolute value determination part 43 acquires the phase difference of the near light-shielding pixel which is another light-shielding pixel near the target pixel from the memory part 31.

At step S11, the positive and negative absolute value determination part 43 determines whether or not the computed phase difference phase_dif of the target pixel has a reliable value. Specifically, the positive and negative absolute value determination part 43 determines whether or not the result obtained by multiplying the phase difference phase_dif of the target pixel by the phase difference of the near light-shielding pixel has a positive value and whether or not the difference absolute value between the phase difference phase_dif of the target pixel and the phase difference of the near light-shielding pixel is a value smaller than a predetermined threshold NEAR_TH.

If determined at step S11 that the computed phase difference phase_dif of the target pixel does not have a reliable value, the process proceeds to step S13.

Meanwhile, if determined at step S11 that the computed phase difference phase_dif of the target pixel has a reliable value, the process proceeds to step S12 and the positive and negative absolute value determination part 43 stores the computed phase difference phase_dif of the target pixel in the memory part 31.

At step S13, the reliability determination part 32 determines whether or not all the pixels stored in the memory part 31 are processed as the target pixel.

If determined at step S13 that all the pixels are not processed as the target pixel, the process proceeds to step S14, and the signal processing circuit 14 set the subsequent pixel not yet processed to the target pixel to the target pixel and returns the process to step S2. This allows the newly set target pixel to be processed under step S2 to step S13.

Meanwhile, if determined at step S13 that all the pixels are processed as the target pixel, the process proceeds to step S15.

At step S15, the region division part 51 divides the pixel region of the pixel array unit 11 into a plurality of regions. For example, the region division part 51 divides the pixel region of the pixel array unit 11 into rectangle regions of the division number n×m.

At step S16, the histogram creation part 52 sets one of the divided plural regions to the target region.

At step S17, the histogram creation part 52 acquires the phase differences in the target region from the memory part 31 to create the histogram of the phase differences in the target region.

At step S18, the region phase difference determination part 53 decides the phase difference in the target region by use of a statistical processing. In other words, the region phase difference determination part 53 excludes the outlier of the phase differences in the target region and computes the mean value of the phase differences using only the phase differences after the exclusion to decide the phase difference in the target region. The decided phase difference is output to a latter stage together with the region information for recognizing the target region.

At step S19, the region phase difference determination part 53 determines whether or not all the regions of the divided plural regions are processed as the target region.

If determined at step S19 that all the region are not yet processed as the target region, the process proceeds to step S20, and the histogram creation part 52 sets a predetermined region not yet processed as the target region to the target region. Thereafter, the process returns to step S16 and step S16 to step S19 described above are repeated.

Meanwhile, if determined at step S19 that all the regions are processed as the target region, the phase difference detection processing by the signal processing circuit 14 ends.

Here, in the above described example, in the process following the computation of the phase difference by the phase difference detection part 33, the computed phase difference is compared with the phase difference of the near light-shielding pixel to determine the reliability of the computed phase difference. However, in some cases the phase difference of the light-shielding pixel near the target pixel may still not be detected. Therefore, the process at steps S10 to S12 may be performed on all the light-shielding pixels after the process at steps S3 to S9 described above are performed on all the light-shielding pixels.

As described above, according to the phase difference detection processing by the signal processing circuit 14, the phase difference of related art which has been detected in a pair of one side light-shielding pixel and opposite side light-shielding pixel can be detected by ways of only a single light-shielding pixel.

For the reason that the phase difference is detected by way of only a single light-shielding pixel, the reliability determination part 32 in the signal processing circuit 14 carries out in advance the reliability determination on whether or not the light-shielding pixel is a pixel appropriate to the phase difference detection. The region unit phase difference decision part 34 divides the pixel region of the pixel array unit 11 into a plurality of regions and subjects the detected plural phase differences in a unit of region to the statistical processing to determine the phase difference in a unit of region.

In this way, according to the phase difference detection processing performed by the signal processing circuit 14 as described herein, the phase difference can be detected by way of only a single light-shielding pixel, improving the degree of freedom of arrangement of the light-shielding pixel and allowing the phase difference to be determined in a micro region and a complex shape region.

The signal processing circuit 14 uses the pixel values of the normal pixels having a high S/N ratio which are densely arranged around the light-shielding pixel to compute the phase difference of the light-shielding pixel, improving an accuracy for detecting the phase difference.

<4. Other Exemplary Arrangements of Light-shielding Pixel>

In the above described embodiment, an example is described in which the pixel array unit 11, as described referring to FIG. 4, has an arrangement which is sparse in the light shielding direction and has another light-shielding pixel arranged in a direction different from the light shielding direction.

In the case of the arrangement shown in FIG. 4, the peripheral pixel row becomes all the normal pixels and the near light-shielding pixel necessary for the positive and negative absolute value determination of the computed phase difference is arranged in the vicinity, more robustly detecting the phase difference.

However, the present method by the signal processing circuit 14 can be applied to other light-shielding pixel arrangements, and is not limited to the example shown in FIG. 4.

With reference to FIG. 12 to FIG. 21, a description will be given of other exemplary arrangements of the light-shielding pixel which the present method by the signal processing circuit 14 can be applied to and the pixel array unit 11 can adopt.

Figure 12:
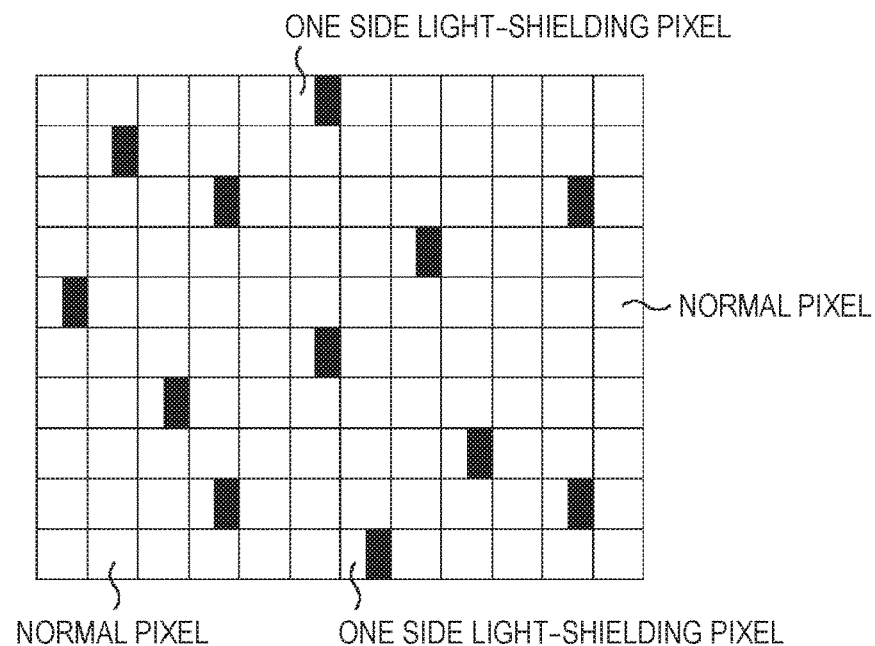
FIG. 12 is a diagram illustrating another exemplary arrangement of light-shielding pixels.

FIG. 4 shows an example in which the one side light-shielding pixels are regularly arranged whereas in FIG. 12 the one side light-shielding pixels are randomly arranged.

Figure 13:
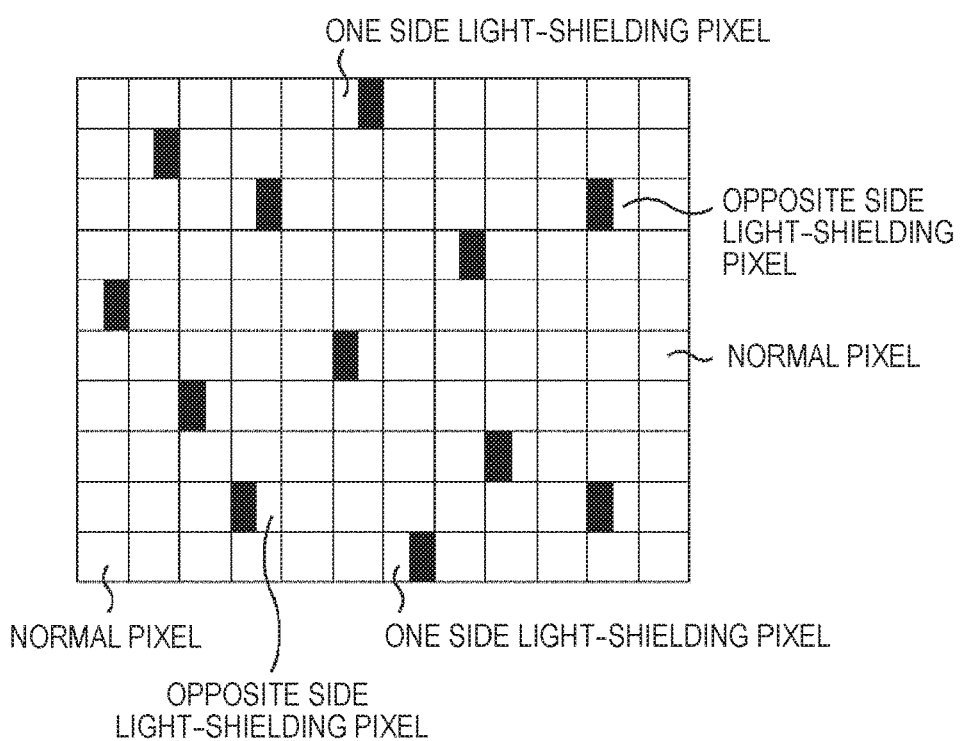
FIG. 13 is a diagram illustrating another exemplary arrangement of light-shielding pixels.

FIG. 13 shows an example in which one side light-shielding pixels and opposite side light-shielding pixels are randomly arranged.

In the phase difference detection of related art, pair of one side light-shielding pixel and an opposite side light-shielding pixel are regularly arranged, and the pixel signal of the light-shielding pixel symmetrically appearing is used to detect the phase difference. Therefore, as shown in FIG. 13, if the one side light-shielding pixels and the opposite side light-shielding pixels are randomly arranged, the pixel signal of the one side light-shielding pixel and the pixel signal of the opposite side light-shielding pixel are difficult to restore and thus the phase difference has been difficult to detect in the related art.

However, in the present method, only one light-shielding pixel and a plurality of normal pixels in the light shielding direction may be necessary, and even an arrangement as shown in FIG. 13 has no problem to be able to detect the phase difference.

Figure 14:
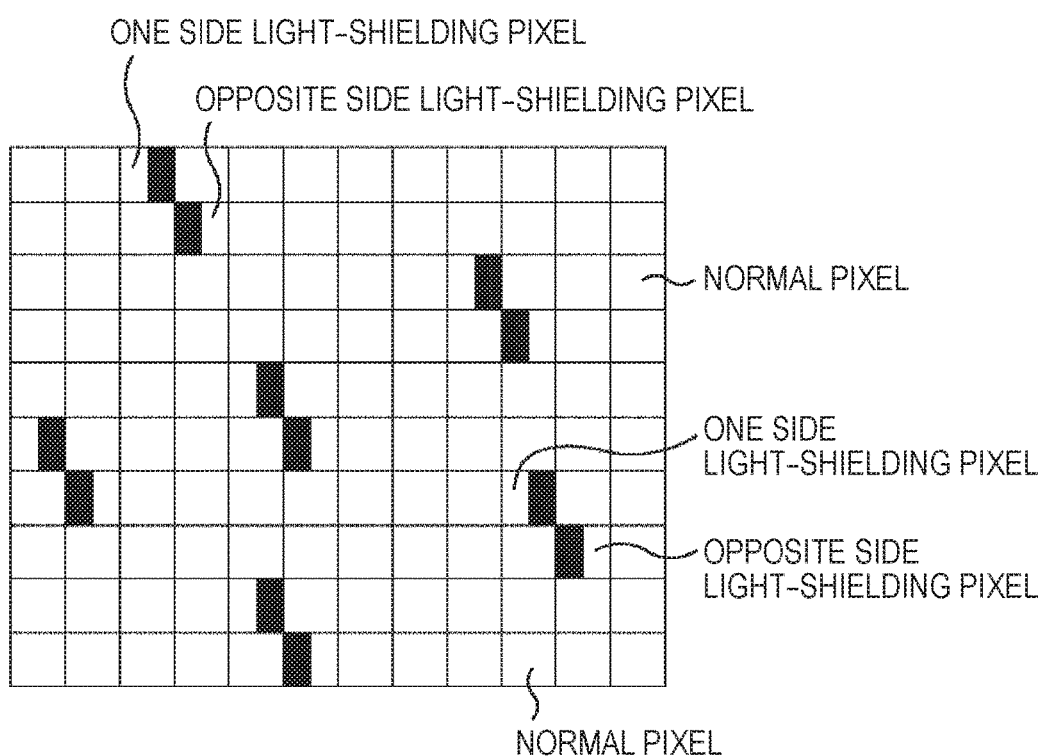
FIG. 14 is a diagram illustrating another exemplary arrangement of light-shielding pixels.
Figure 15:
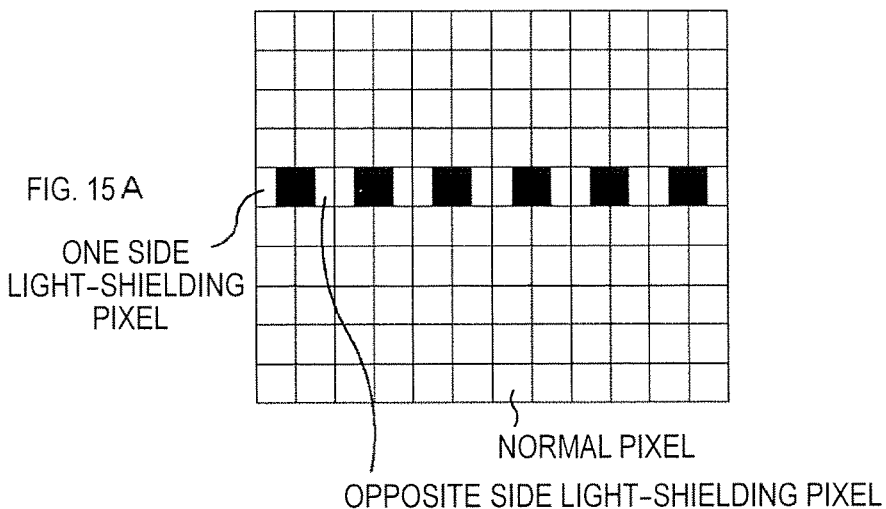
FIGS. 15A-15C are diagrams illustrating other exemplary arrangements of light-shielding pixels.
Figure 15:
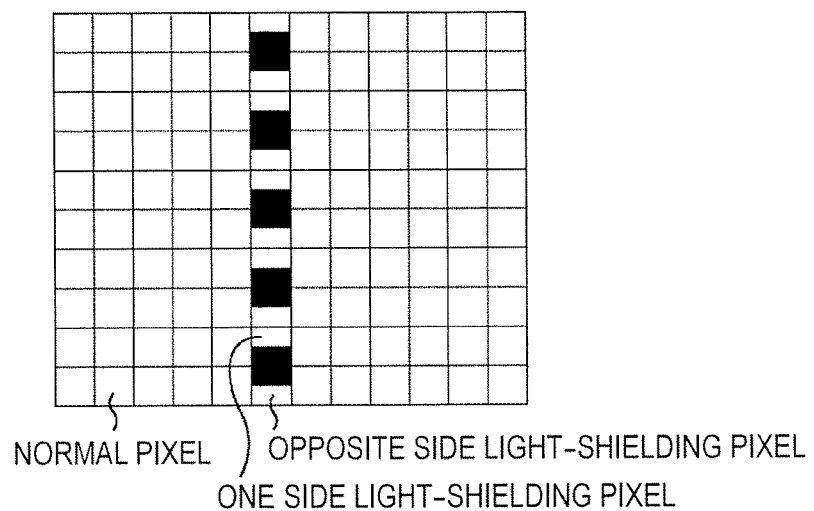
Figure 15:
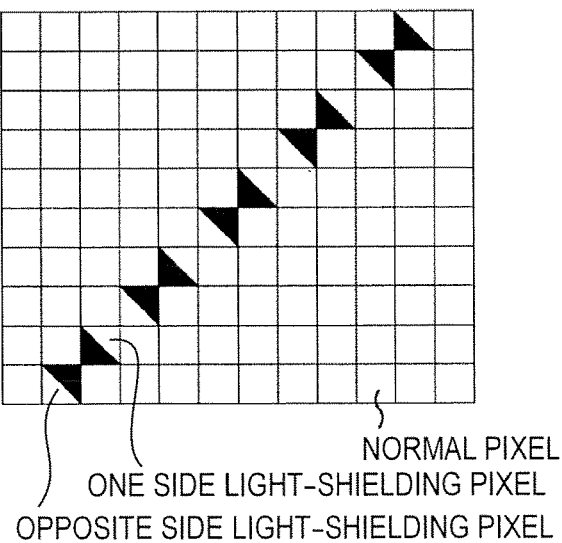
Figure 16:
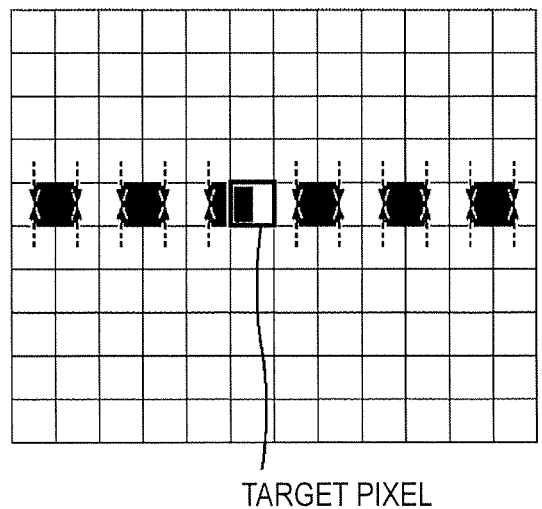
FIGS. 16A-16C are diagrams illustrating other exemplary arrangements of light-shielding pixels.
Figure 16:
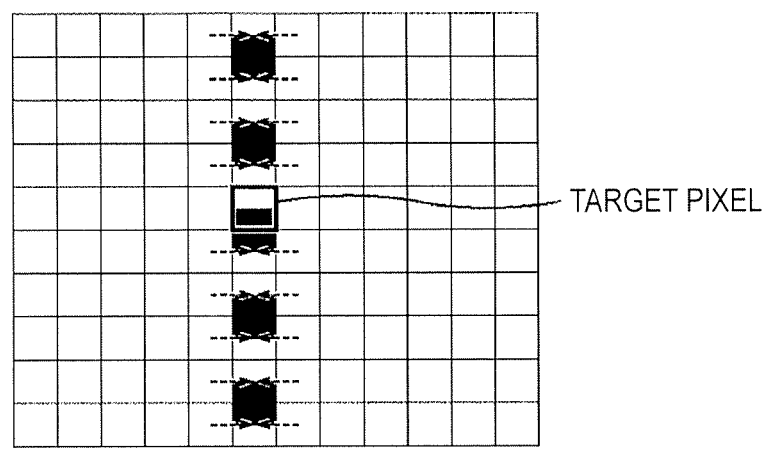
Figure 16:
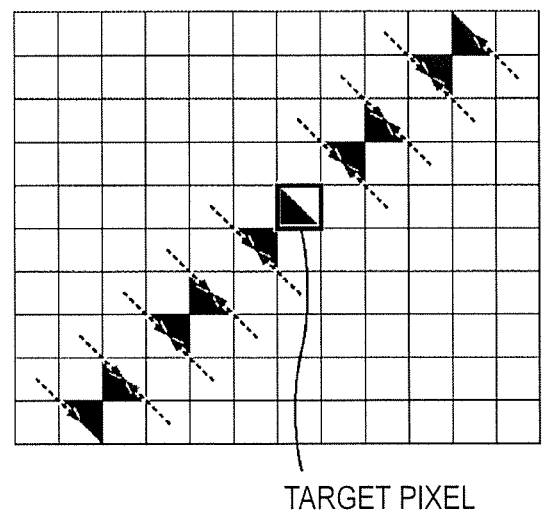
Figure 17:
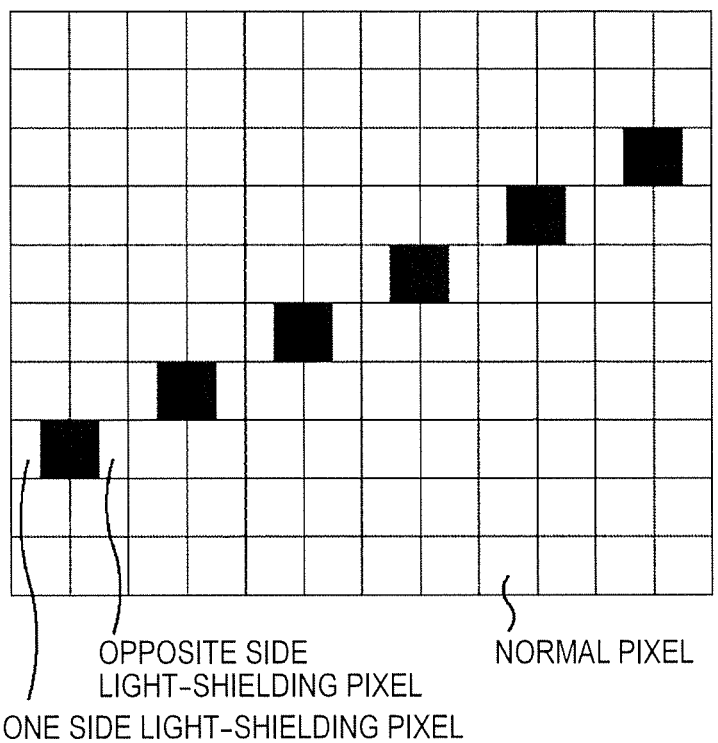
FIGS. 17A-17B are diagrams illustrating other exemplary arrangements of light-shielding pixels.
Figure 17:
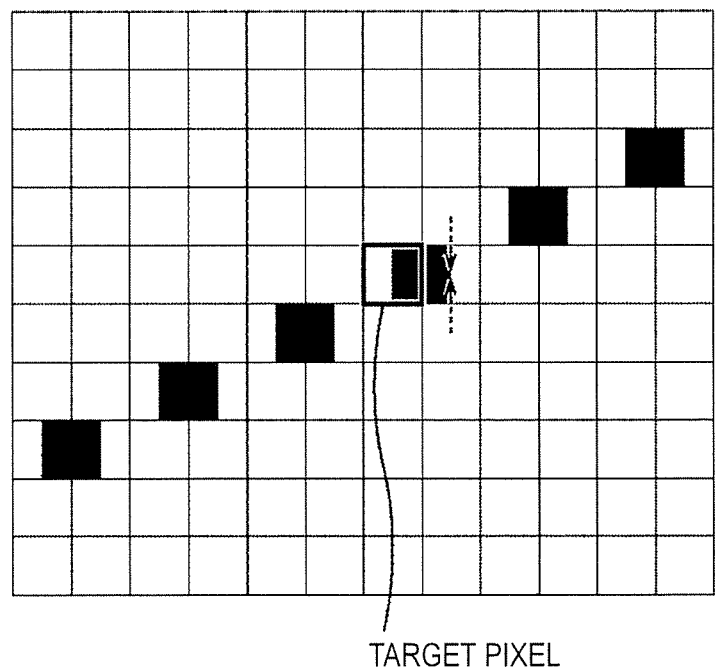

FIG. 14 shows an example in which pairs of one side light-shielding pixel and opposite side light-shielding pixel are randomly arranged.

In the case of such an arrangement, the peripheral pixel row set in the light shielding direction becomes all the normal pixels and the other light-shielding pixel of the pair can be used for the near light-shielding pixel for the positive and negative absolute value determination, more robustly detecting the phase difference.

In the arrangement in FIG. 14, the near light-shielding pixel of the target pixel is a light-shielding pixel having the light-shielding region opposite to that in the target pixel. Therefore, in the positive and negative absolute value determination processing, if a result obtained by multiplying the phase difference of the target pixel by the phase difference of the near light-shielding pixel has a negative value (<0) and the difference in absolute values between the phase difference of the target pixel and the phase difference of the near light-shielding pixel is a value smaller than a predetermined threshold NEAR_TH, the detected phase difference of the target pixel is determined to have a reliable value.

FIGS. 15A-15C show an exemplary arrangement of the light-shielding pixel of related art.

FIG. 15A shows an example in which a pair of one side light-shielding pixel with the right side thereof being shielded and opposite side light-shielding pixel with the left side thereof being shielded is aligned and arranged in the horizontal direction as the light shielding direction.

FIG. 15B shows an example in which a pair of one side light-shielding pixel with the lower side thereof being shielded and opposite side light-shielding pixel with the upper side thereof being shielded is aligned and arranged in the vertical direction as the light shielding direction FIG. 15C shows an example in which a pair of one side light-shielding pixel with the lower left side thereof being shielded and opposite side light-shielding pixel with the upper right side thereof being shielded is aligned and arranged in the right oblique direction as the light shielding direction.

The present method can be adopted also by such an exemplary arrangement of related art can adopt.

However, the present method uses the pixel value of the peripheral pixel row in the light shielding direction with respect to the target pixel to determine whether or not the target pixel is a pixel appropriate to the phase difference. For this reason, the present method can be applied to the arrangement in FIG. 15A in such a manner that values are used which are obtained by interpolation by use of the pixel values of pixels at the periphery of the light-shielding pixels, for example, the normal pixels above and below the light-shielding pixels, as the pixel values of a plurality of light-shielding pixels in the light shielding direction set to the peripheral pixel row, as shown in FIG. 16A.

The present method can be applied to the arrangement in FIG. 15B in such a manner that values are used which are obtained by interpolation by use of the pixel values of pixels at the periphery of the light-shielding pixels, for example, the normal pixels on the right and left of the light-shielding pixels, as the pixel values of a plurality of light-shielding pixels in the light shielding direction set to the peripheral pixel row, as shown in FIG. 16B.

The present method can be applied to the arrangement in FIG. 15C in such a manner that values are used which are obtained by interpolation by use of the pixel values of pixels at the periphery of the light-shielding pixels, for example, the normal pixels on the upper left and lower left of the light-shielding pixels, as the pixel values of a plurality of light-shielding pixels in the light shielding direction set to the peripheral pixel row, as shown in FIG. 16C.

The exemplary arrangements of related art shown in FIGS. 15A-15C, which have the light-shielding pixel aligned in the light shielding direction in a line, is advantageous in the phase difference detection, but the image quality of an imaged image will likely deteriorate. Therefore, as shown in FIG. 17A, an arrangement in which a pair of one side light-shielding pixel and opposite side light-shielding pixel is arranged in a direction different from the light shielding direction has been also adopted in the related art.

The present method can be adopted in an arrangement as shown in FIG. 17A. In this case also, since a plurality of pixels set to the peripheral pixel row include the light-shielding pixel, the present method can be applicable in such a manner that values are used which are obtained by interpolation by use of, for example, the pixel value of the normal pixel above and below the light-shielding pixel, as the pixel value of the light-shielding pixel, as shown in FIG. 17B.

FIGS. 15A-15C and FIGS. 17A-17B show the exemplary arrangements of related art in which a pair of one side light-shielding pixel and opposite side light-shielding pixel is arranged in the horizontal direction, vertical direction and oblique direction, but the present method can detect the phase difference even by way of only the one side light-shielding pixel as described above, allowing the phase difference to be detected even in the arrangements shown in FIG. 18 to FIG. 21.

Figure 18:
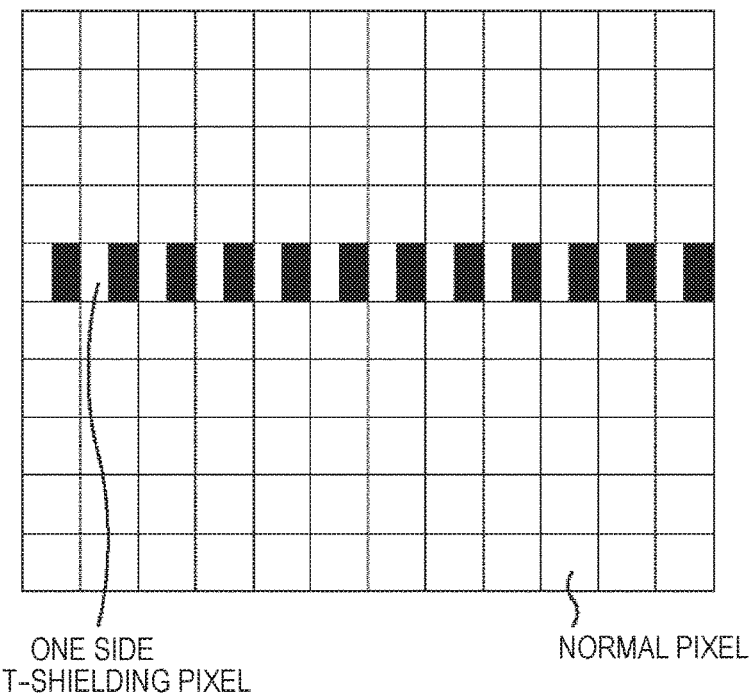
FIG. 18 is a diagram illustrating another exemplary arrangement of light-shielding pixels.

FIG. 18 shows an example in which only the one side light-shielding pixel having the light-shielding region on the right side thereof is aligned and arranged in the horizontal direction as the light shielding direction.

Figure 19:
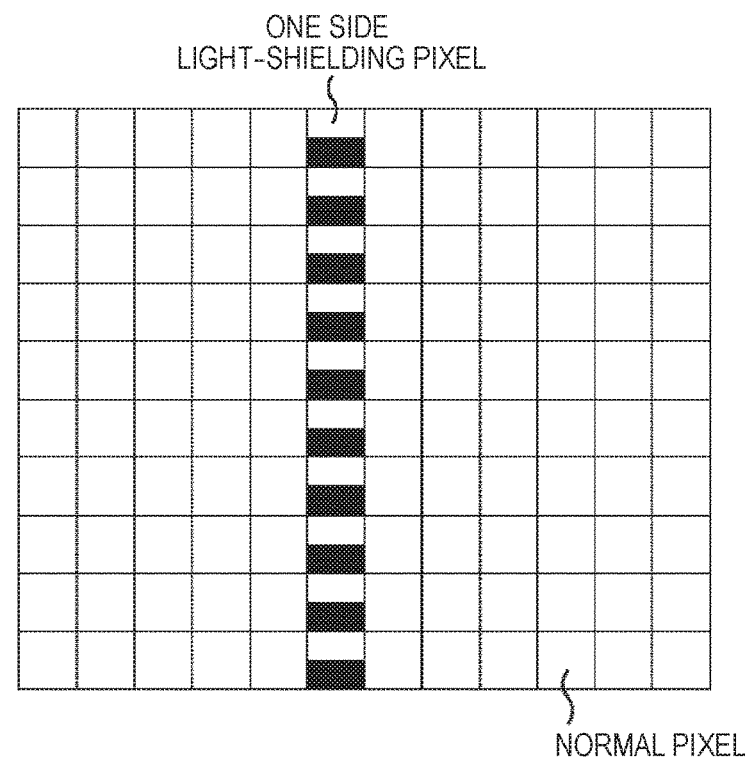
FIG. 19 is a diagram illustrating another exemplary arrangement of light-shielding pixels.

FIG. 19 shows an example in which only the one side light-shielding pixel having the light-shielding region on the lower side thereof is aligned and arranged in the vertical direction as the light shielding direction.

Figure 20:
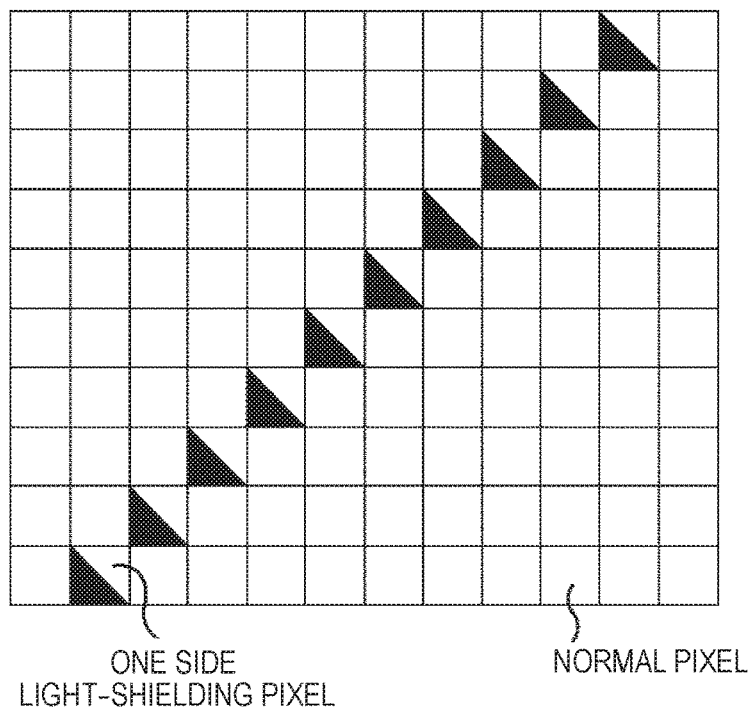
FIG. 20 is a diagram illustrating another exemplary arrangement of light-shielding pixels.

FIG. 20 shows an example in which the one side light-shielding pixel having the light-shielding region on the lower left side thereof is aligned and arranged in the oblique direction as the light shielding direction.

Figure 21:
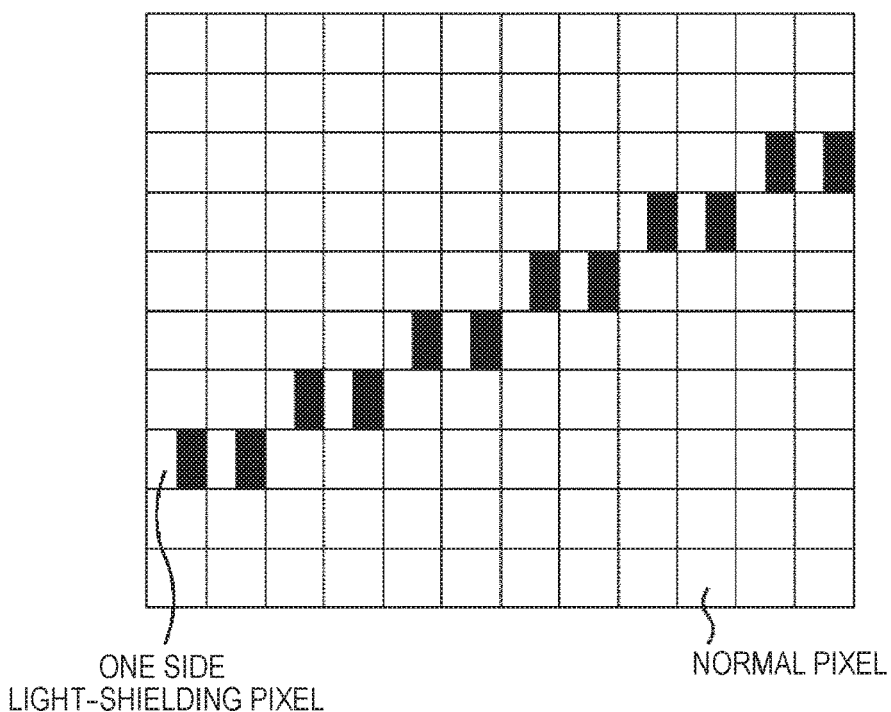
FIG. 21 is a diagram illustrating another exemplary arrangement of light-shielding pixels.

Further, even in an arrangement in which a pair of one side light-shielding pixels is arranged in a direction different from the light shielding direction as shown in FIG. 21, the phase difference can be detected according to the present method.

In this way, according to the present method, the phase difference can be detected by way of only a single light-shielding pixel, improving the degree of freedom of arrangement of the light-shielding pixels for detecting the phase difference.

<5. Exemplary Substrate Configuration of Solid-state Imaging Apparatus>

Next, with reference to FIGS. 22A-22C, a description will be given of a substrate configuration of the solid-state imaging apparatus 1 in FIG. 1.

Figure 22A:
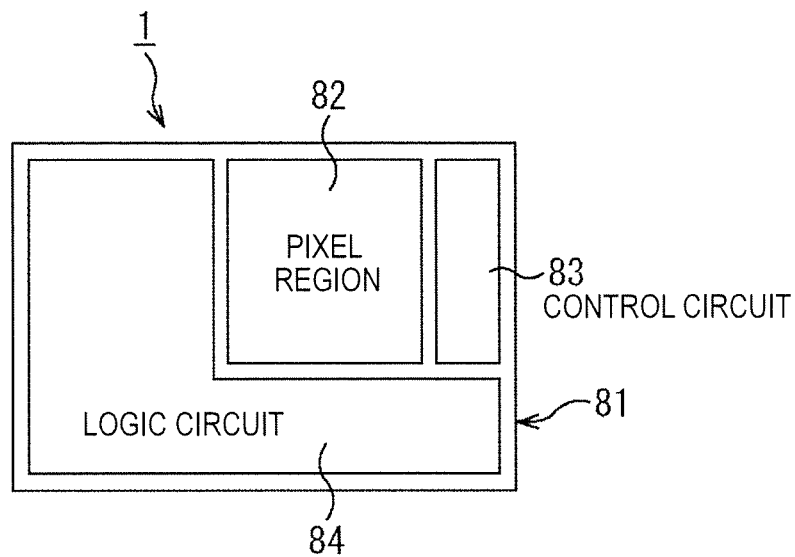
FIGS. 22A-22C are diagrams explaining substrate configurations of solid-state imaging apparatuses in accordance with embodiments of the present disclosure.
Figure 22B:
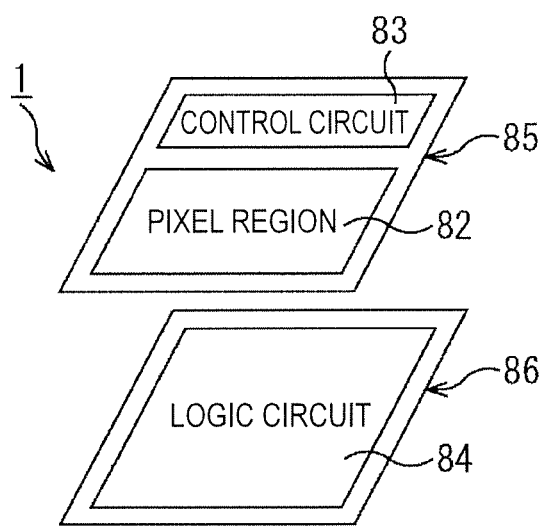
Figure 22C:
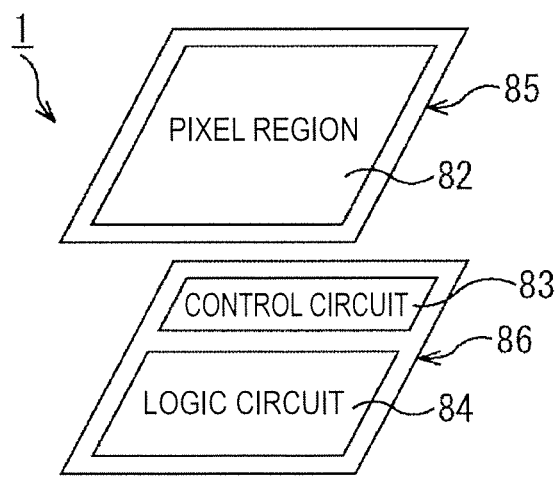

The solid-state imaging apparatus 1 can be formed by using a semiconductor substrate made of silicon (Si) and the like, and adopting any of first to third substrate configurations shown in FIG. 22A to FIG. 22C.

FIG. 22A shows the first substrate configuration for the solid-state imaging apparatus 1.

The solid-state imaging apparatus 1 in FIG. 22A is configured to mount a pixel region 82, control circuit 83, and logic circuit 84 for processing a signal in one semiconductor substrate 81. The pixel region 82 in FIG. 22A includes the pixel array unit 11 in FIG. 1, for example, and the control circuit 83 in FIG. 22A includes the AD converter 12, horizontal transfer unit 13, timing controller 15, pixel drive unit 16 and the like in FIG. 1. The logic circuit 84 in FIG. 22A includes the signal processing circuit 14 in FIG. 1.

FIG. 22B shows the second substrate configuration for the solid-state imaging apparatus 1.

In the second substrate configuration, the solid-state imaging apparatus 1 includes a first semiconductor substrate 85 and a second semiconductor substrate 86 that are stacked, and the first semiconductor substrate 85 has the pixel region 82 and control circuit 83 formed thereon and the second semiconductor substrate 86 has the logic circuit 84 formed thereon.

FIG. 22C shows the third substrate configuration for the solid-state imaging apparatus 1.

Similar to the second substrate configuration, the third substrate configuration includes a first semiconductor substrate 85 and a second semiconductor substrate 86 that are stacked with one another. However, the first semiconductor substrate 85 has only the pixel region 82 formed thereon and the second semiconductor substrate 86 has the control circuit 83 and logic circuit 84 formed thereon.

The solid-state imaging apparatus 1 can be manufactured in the substrate configuration as above.

<Other Embodiments>

Next, a description will be given of other embodiments of the signal processing circuit performing the above described phase difference detection processing.

<Embodiment of Separated Signal Processing Circuit>

Figure 23:
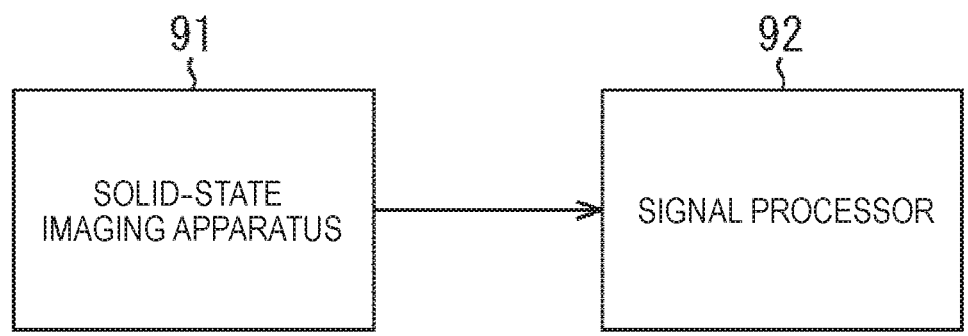
FIG. 23 is a block diagram illustrating a form in which the signal processing circuit is separated.

FIG. 23 shows an exemplary configuration in which the signal processing circuit performing the above described phase difference detection processing is separated as a signal processor.

In other words, in the above described example, as explained referring to FIG. 1, the signal processing circuit 14 performing the phase difference detection processing is provided as a part of the solid-state imaging apparatus 1.

However, the configuration in the example of FIG. 23 includes a solid-state imaging apparatus 91 corresponding to the imaging unit 17 in FIG. 1 and the signal processor 92, which is provided separately from the apparatus 91, corresponding to the signal processing circuit 14 in FIG. 1.

The solid-state imaging apparatus 91 can adopt the configurations described above in FIG. 4, FIG. 12 to FIGS. 15A-15C, FIG. 17A, FIG. 18 to FIG. 21 and the like as the light-shielding pixel arrangement to give an apparatus having the improved degree of freedom of arrangement of the light-shielding pixels for detecting the phase difference.

The signal processor 92 performs the above described phase difference detection processing on the basis of the pixel signal output from the solid-state imaging apparatus 91 to output the detected phase difference. The signal processor 92 computes the pixel value of the light-shielding pixel by way of interpolation to be output as the pixel signal for video output together with the pixel value of the normal pixel.

<6. Exemplary Application to Electronic Device>

The solid-state imaging apparatus and signal processor to which the present technology is applied are applicable to various electronic devices including an imaging apparatus such as a digital still camera and a digital video camera, a cellular phone provided with an imaging function, or an audio player provided with an imaging function, for example. The solid-state imaging apparatus and signal processor may be formed as one chip, or as a module having an imaging function with an imaging unit and signal processing circuit being packaged together.

Figure 24:
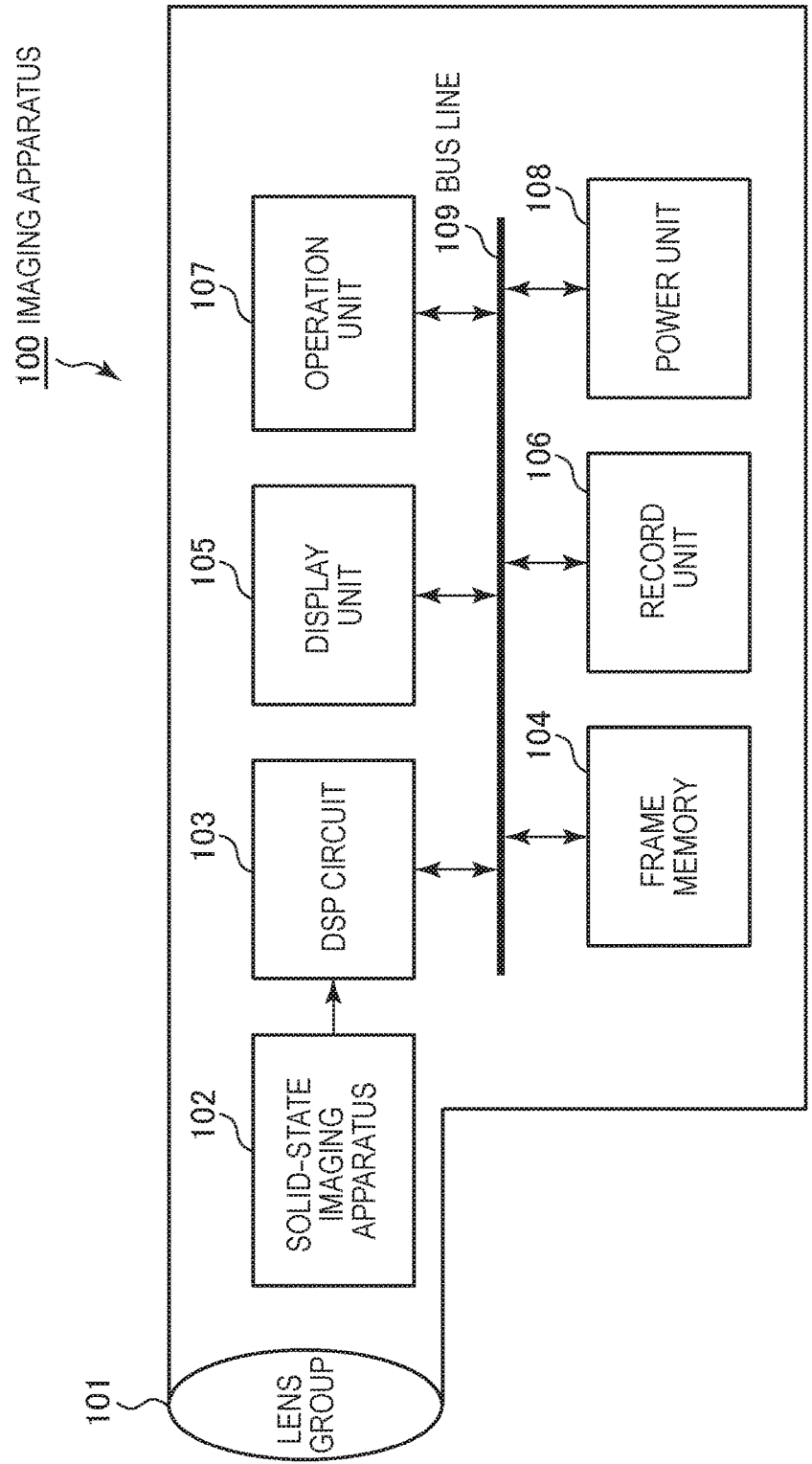
FIG. 24 is a block diagram illustrating an exemplary configuration of an imaging apparatus as an electronic device to which the present technology is applied.

FIG. 24 is a block diagram illustrating an exemplary configuration of an imaging apparatus as an electronic device to which the present technology is applied.

An imaging apparatus 100 in FIG. 24 includes an optical unit 101 constituted by a lens group and the like, a solid-state imaging apparatus (imaging device) 102 having the configuration of the above described solid-state imaging apparatus 91, and a DSP (digital signal processor) circuit 103 having the function of the above described signal processing circuit 14. The imaging apparatus 100 also includes a frame memory 104, display unit 105, record unit 106, operation unit 107, and power unit 108. The DSP circuit 103, frame memory 104, display unit 105, record unit 106, operation unit 107, and power unit 108 are connected with each other via a bus line 109.

The optical unit 101 takes in incident light (image light) from the subject to form an image on an imaging area of the solid-state imaging apparatus 102. The solid-state imaging apparatus 102 transforms a light amount of the incident light which is formed into an image on the imaging area by the optical unit 101 into an electrical signal in a unit of pixel to output as the pixel signal.

The display unit 105 includes a panel type display device such as a liquid crystal panel and an organic EL (electro luminescence) panel, for example, and displays a moving picture or still image taken by the solid-state imaging apparatus 102. The record unit 106 records a moving picture or still image taken by the solid-state imaging apparatus 102 in a storage medium such as a hard disk or a semiconductor memory.

The operation unit 107 issues an operation instruction concerning various functions the imaging apparatus 100 has via an operation by the user. The power unit 108 adequately supplies various powers as an operation power for the DSP circuit 103, frame memory 104, display unit 105, record unit 106, and operation unit 107 to these units as targets to be supplied with the power.

The present technology is not limited to a solid-state imaging apparatus that detects and takes as an image a distribution of an incident light amount of visible light, but is also applicable to a solid-state imaging apparatus which takes as an image a distribution of an incident amount of infrared, X-ray or particle, and a general solid-state imaging apparatus (physical amount detection device) such as a finger print detection sensor which detects and takes as an image other physical amount distributions of pressures, electrostatic capacitance, or the like in a broad sense.

The embodiment of the present technology is not limited to the above described embodiment, and can be variously changed without departing from the scope of the present technology.

Additionally, the present technology may also be configured as below.

(1) An image sensor apparatus, comprising:
    a pixel array unit, including:
        a plurality of pixels, wherein a first subset of the pixels included in the plurality of pixels are light shielding pixels, wherein a second subset of the pixels included in the plurality of pixels are normal pixels, and wherein a phase difference detection signal is formed from a pixel value from a first light shielding pixel and one or more pixel values from some of the normal pixels.

(2) The apparatus according to (1), further including
    a signal processing circuit, wherein the signal processing circuit includes a phase difference detection part, wherein the phase difference detection part is configured to acquire the pixel value from the first light shielding pixel and the pixel values from the one or more pixel values of some of the normal pixels, calculate a corrected pixel value of the first light shielding pixel, and compare the corrected pixel value to at least some of the pixel values acquired from the normal pixels to detect a phase difference of the first light shielding pixel.

(3) The apparatus according to (2), further including:
a reliability determination part configured to determine whether the pixel value acquired from the first light shielding pixel is appropriate for phase difference detection.

(4) The apparatus according to (3), wherein
the reliability determination part includes a dynamic range determination part configured to determine whether a dynamic range of the acquired pixel values of the normal pixels is greater than a threshold amount.

(5) The apparatus according to (4), wherein
the reliability determination part includes a monotonic increase and decrease determination part configured to determine whether the pixel values acquired from the normal pixels has a tendency of at least one of a monotonic increase and a monotonic decrease.

(6) The apparatus according to (3), wherein
the reliability determination part includes a detected phase difference determination part that is configured to compare the detected phase difference of the first light shielding pixel to a phase difference detected for a second light shielding pixel, and to determine whether a value of the detected phase difference multiplied by a value of the detected phase difference for the second light shielding pixel is positive or negative.

(7) The apparatus according to (6), wherein
a position of a light shielding region for each of the first and second light shielding pixels is the same.

(8) The apparatus according to (6), wherein
the reliability determination part is configured to determine whether a difference between an absolute value of the detected phase difference of the first light shielding pixel and an absolute value of the detected phase difference of the second light shielding pixel is less than a predetermined threshold.

(9) The apparatus according to (2), wherein
the corrected pixel value depends on a light shielding rate of the first light shielding pixel.

(10) A solid state image sensor, comprising:
a plurality of pixels,
wherein a first subset of the pixels included in the plurality of pixels are light shielding pixels,
wherein a second subset of the pixels included in the plurality of pixels are normal pixels, and
wherein a position of a light shielding region is the same for all of the light shielding pixels.

(11) A method for detecting a phase difference of pixels in an image sensor, comprising:
obtaining a pixel value from a first light shielding pixel of the image sensor;
obtaining pixel values from a first plurality of normal pixels of the image sensor;
calculating a gain correction value for the first light shielding pixel to obtain a corrected pixel value;
comparing the corrected pixel value of the first light shielding pixel to pixel values of at least some of the normal pixels in the first plurality of pixels to obtain a phase difference value for the first light shielding pixel.

(12) The method according to (11), wherein
the normal pixels in the first plurality of pixels are arranged along a line corresponding to a light shielding direction of the first light shielding pixel.

(13) The method according to (12), wherein
the light shielding direction of the first light shielding pixel is a left or right side direction, and wherein the normal pixels of the first plurality of pixels are in the same row of pixels as the first light shielding pixel.

(14) The method according to (12), wherein
the light shielding direction of the first light shielding pixel is a top or bottom side direction, and wherein the normal pixels of the first plurality of pixels are in the same column of pixels as the first light shielding pixel.

(15) The method according to (12), wherein
the light shielding direction of the first light shielding pixel is a first or second oblique direction, and wherein the normal pixels of the first plurality of pixels lie along a line corresponding to the oblique direction that intersects the first light shielding pixel.

(16) The method according to (12), wherein
the first light shielding pixel is one of a plurality of light shielding pixels included in the image sensor, and wherein the light shielding direction for all of the light shielding pixels in the plurality of light shielding pixels is the same.

(17) The method according to (12), further comprising:
calculating a dynamic range from at least some of the normal pixels.

(18) The method according to (17), further comprising:
determining whether the calculated dynamic range from the at least some of the normal pixels is greater than a threshold amount;
in response to determining that the calculated dynamic range from the at least some of the normal pixels is greater than a threshold amount, determining whether the pixel values for the at least some of the normal pixels has a tendency of at least one of a monotonic increase and a monotonic decrease.

(19) The method according to (18), further comprising:
in response to determining that the pixel values for the at least some of the normal pixels has a tendency of at least one of a monotonic increase and a monotonic decrease, applying the obtained phase difference value for the first light shielding pixel to control an imaging optical system.

(20) The method according to (19), further comprising:
determining whether the obtained phase difference value is reliable by comparing the obtained phase difference value for the first light shielding pixel to an obtained phase difference value for a second light shielding pixel.

What is claimed is:
1. An image sensor apparatus, comprising:
a pixel array unit, including:
a plurality of normal pixels in a first and a second row, wherein the second row is adjacent to the first row;
a first light shielding pixel between first and second normal pixels in the first row, wherein the first normal pixel and the second normal pixel are immediately adjacent to the first light shielding pixel; and
a second light shielding pixel between third and fourth normal pixels in the second row, wherein the third normal pixel and the fourth normal pixel are immediately adjacent to the second light shielding pixel; and
a signal processing circuit that detects a phase difference of the first light shielding pixel,
wherein the first light shielding pixel is shielded on a first side of a first pixel area, wherein the second light shielding pixel is shielded on a second side of a second pixel area, the second side being opposite to the first side, wherein the first side and the second side are diagonally adjacent to one another, wherein the first light shielding pixel and the second light shielding pixel form a light shielding pixel pair, and wherein at least nine normal pixels are immediately adjacent to the light shielding pixel pair, the at least nine normal pixels including the first, second, third, and fourth normal pixels, wherein the signal processing circuit includes a phase difference detection part to detect the phase difference of the first light shielding pixel by:

acquiring a pixel value from the first light shielding pixel and pixel values from some of the plurality of normal pixels including at least one of the first normal pixel and the second normal pixel;

calculating a corrected pixel value of the first light shielding pixel; and comparing the corrected pixel value to the pixel values of the some of the plurality of normal pixels to detect the phase difference of the first light shielding pixel.

2. The apparatus of claim 1, wherein a phase difference detection signal is formed from the pixel value from the first light shielding pixel and a pixel value from the second light shielding pixel.

3. The image sensor apparatus of claim 1, wherein the signal processing circuit further includes:

a reliability determination part configured to determine whether the pixel value acquired from the first light shielding pixel is appropriate for phase difference detection of a target region based on i) whether a result obtained by multiplying the phase difference of the first light shielding pixel by a phase difference of a near light-shielding pixel has a positive value, and ii) whether an absolute value of a difference between the phase difference of the first light shielding pixel and the phase difference of the near light-shielding pixel is a value smaller than a predetermined threshold, wherein the near light-shielding pixel is a light shielding pixel near the first light shielding pixel.

4. An image sensor apparatus, comprising: a pixel array unit, including:

a plurality of normal pixels in a first row and a second row, wherein the second row is adjacent to the first row;

a first light shielding pixel in the first row; and a second light shielding pixel in the second row and diagonally adjacent to the first light shielding pixel; and a signal processing circuit that detects a phase difference of the first light shielding pixel wherein the first light shielding pixel is shielded on a left side, wherein the second light shielding pixel is shielded on a right side, wherein the first light shielding pixel and the second light shielding pixel are between a first normal pixel and a second normal pixel of the plurality of normal pixels in their respective rows, wherein the first light shielding pixel and the second light shielding pixel form a light shielding pixel pair, and wherein at least nine normal pixels are immediately adjacent to the light shielding pixel pair, the at least nine normal pixels including the first normal pixel and the second normal pixel of the plurality of normal pixels in the respective rows, wherein the signal processing circuit includes a phase difference detection part to detect the phase difference of the first light shielding pixel by:

acquiring a pixel value from the first light shielding pixel and pixel values from some of the plurality of normal pixels including at least one of the first normal pixel and the second normal pixel;

calculating a corrected pixel value of the first light shielding pixel; and comparing the corrected pixel value to the pixel values of the some of the plurality of normal pixels to detect the phase difference of the first light shielding pixel.

5. An image sensor apparatus, comprising:

a pixel array unit, including:

a first light shielding pixel;

a second light shielding pixel;

a first plurality of normal pixels immediately adjacent to the first light shielding pixel to surround at least three sides of the first light shielding pixel; and a second plurality of normal pixels immediately adjacent to the second light shielding pixel to surround at least three sides of the second light shielding pixel; and a signal processing circuit that detects a phase difference of the first light shielding pixel, wherein the first light shielding pixel is shielded on a first side, wherein the second light shielding pixel is shielded on a second side that is at a different location in the second light shielding pixel than the first side is in the first light shielding pixel, wherein the first light shielding pixel and the second light shielding pixel are spaced apart from one another by at least one of the first plurality of normal pixels and the second plurality of normal pixels, wherein the first plurality of normal pixels is at least five normal pixels, and wherein the second plurality of normal pixels is at least five normal pixels, wherein the signal processing circuit includes a phase difference detection part to detect the phase difference of the first light shielding pixel by:

acquiring a pixel value from the first light shielding pixel and pixel values from some of the plurality of normal pixels including at least one of the first normal pixel and the second normal pixel;

calculating a corrected pixel value of the first light shielding pixel; and comparing the corrected pixel value to the pixel values of the some of the plurality of normal pixels to detect the phase difference of the first light shielding pixel.

6. The image sensor apparatus of claim 5, wherein the first side and the second side are opposite sides.

* * * * *